(12) United States Patent
Ording et al.

(10) Patent No.: US 8,806,362 B2
(45) Date of Patent: Aug. 12, 2014

(54) DEVICE, METHOD, AND GRAPHICAL USER INTERFACE FOR ACCESSING ALTERNATE KEYS

(75) Inventors: Bas Ording, San Francisco, CA (US); Kenneth L. Kocienda, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 351 days.

(21) Appl. No.: 12/790,479

(22) Filed: May 28, 2010

(65) Prior Publication Data

US 2011/0163973 A1 Jul. 7, 2011

Related U.S. Application Data

(60) Provisional application No. 61/292,500, filed on Jan. 6, 2010.

(51) Int. Cl.
*G06F 3/00* (2006.01)

(52) U.S. Cl.
USPC ............................ 715/773; 345/173; 345/168

(58) Field of Classification Search
CPC ................... G06F 3/0482; G06F 2203/04808; G06F 3/017
USPC .................................. 345/173, 168; 715/773
See application file for complete search history.

(56) References Cited

U.S. PATENT DOCUMENTS

| | | | |
|---|---|---|---|
| 5,038,401 A | 8/1991 | Inotsume | 455/92 |
| 5,053,758 A | 10/1991 | Cornett et al. | 340/712 |
| 5,297,041 A | 3/1994 | Kushler et al. | 364/419.15 |
| 5,565,894 A | 10/1996 | Bates et al. | 345/178 |
| 5,689,667 A | 11/1997 | Kurtenbach | |
| 5,736,974 A | 4/1998 | Selker | 345/146 |
| 5,748,512 A | 5/1998 | Vargas | 364/709.12 |
| 5,801,941 A | 9/1998 | Bertram | 364/188 |

(Continued)

FOREIGN PATENT DOCUMENTS

| | | | | |
|---|---|---|---|---|
| EP | 0 880 090 A2 | 11/1998 | | G06F 3/033 |
| EP | 1 271 295 A2 | 1/2003 | | G06F 3/033 |

(Continued)

OTHER PUBLICATIONS

Casario, M., "Hands on Macromedia World: Touch Screen Keypad for Mobile Phone by DoCoMo," printed Nov. 18, 2005, 1 page, http://casario.blogs.com/mmworld/2005/10/touch_screen_ke.html.

(Continued)

*Primary Examiner* — Kieu Vu
*Assistant Examiner* — Andrew Chung
(74) *Attorney, Agent, or Firm* — Morrison & Foerster LLP

(57) ABSTRACT

A method at a multifunction device with a touch-sensitive display includes: displaying a text entry region and a soft keyboard with default keys; detecting a contact at a first location on the touch-sensitive display that corresponds to an activation region associated with a respective default key, and detecting an immediate subsequent movement of the contact on the touch-sensitive display; in response to detecting the immediate subsequent movement, displaying an array of keys including alternate keys for the respective default key; detecting liftoff of the contact at a second location on the touch-sensitive display; and, in response to detecting the liftoff: when the second location corresponds to an activation region associated with a respective alternate key, ceasing to display the array and inserting a character associated with the respective alternate key into the text entry region.

18 Claims, 19 Drawing Sheets

(56) References Cited

U.S. PATENT DOCUMENTS

| | | | |
|---|---|---|---|
| 5,805,167 A | 9/1998 | van Cruyningen | 345/353 |
| 5,818,451 A | 10/1998 | Bertram et al. | 345/354 |
| 5,963,671 A | 10/1999 | Comerford et al. | 382/230 |
| 5,999,895 A | 12/1999 | Forest | 704/1 |
| 6,040,824 A | 3/2000 | Maekawa et al. | 345/173 |
| 6,049,326 A | 4/2000 | Beyda et al. | 345/157 |
| 6,073,036 A | 6/2000 | Heikkinen et al. | 455/575 |
| 6,094,197 A | 7/2000 | Buxton et al. | 345/358 |
| 6,169,538 B1 | 1/2001 | Nowlan et al. | 345/168 |
| 6,259,436 B1 | 7/2001 | Moon et al. | 345/173 |
| 6,271,835 B1 | 8/2001 | Hoeksma | 345/168 |
| 6,292,179 B1 | 9/2001 | Lee | |
| 6,295,052 B1 | 9/2001 | Kato et al. | |
| 6,323,846 B1 | 11/2001 | Westerman et al. | 345/173 |
| 6,359,572 B1 | 3/2002 | Vale | 341/23 |
| 6,424,338 B1 | 7/2002 | Anderson | |
| 6,456,952 B1 | 9/2002 | Nathan | 702/94 |
| 6,469,722 B1 | 10/2002 | Kinoe et al. | 345/837 |
| 6,570,557 B1 | 5/2003 | Westerman et al. | 345/173 |
| 6,573,844 B1 | 6/2003 | Venolia et al. | 341/22 |
| 6,597,345 B2 | 7/2003 | Hirshberg | 345/168 |
| 6,654,733 B1 | 11/2003 | Goodman et al. | 706/52 |
| 6,677,932 B1 | 1/2004 | Westerman | 345/173 |
| 6,795,059 B2 | 9/2004 | Endo | 345/173 |
| 6,803,905 B1 | 10/2004 | Capps et al. | 345/173 |
| 6,857,800 B2 | 2/2005 | Zhang et al. | 400/473 |
| 6,926,609 B2 | 8/2005 | Martin | 463/36 |
| 6,975,304 B1 | 12/2005 | Hawkins et al. | |
| 7,038,659 B2 | 5/2006 | Rajkowski | 345/156 |
| 7,057,607 B2 | 6/2006 | Mayoraz et al. | 345/173 |
| 7,075,512 B1 | 7/2006 | Fabre et al. | 345/156 |
| 7,098,896 B2* | 8/2006 | Kushler et al. | 345/168 |
| 7,194,699 B2 | 3/2007 | Thomson et al. | 715/823 |
| 7,443,316 B2 | 10/2008 | Lim | 341/22 |
| 7,477,240 B2 | 1/2009 | Yanagisawa | 345/173 |
| 7,526,738 B2 | 4/2009 | Ording et al. | 715/862 |
| 7,614,008 B2 | 11/2009 | Ording | 715/773 |
| 7,694,231 B2 | 4/2010 | Kocienda et al. | |
| 7,706,616 B2 | 4/2010 | Kristensson et al. | |
| 7,898,529 B2 | 3/2011 | Fitzmaurice et al. | |
| 2002/0015024 A1 | 2/2002 | Westerman et al. | 345/173 |
| 2002/0051018 A1 | 5/2002 | Yeh | 345/784 |
| 2002/0135615 A1 | 9/2002 | Lang | 345/764 |
| 2002/0140679 A1 | 10/2002 | Wen | 345/168 |
| 2002/0140680 A1 | 10/2002 | Lu | 345/169 |
| 2002/0167545 A1 | 11/2002 | Kang et al. | 345/780 |
| 2003/0014239 A1 | 1/2003 | Ichbiah et al. | 704/7 |
| 2003/0063073 A1 | 4/2003 | Geaghan et al. | 345/173 |
| 2003/0197736 A1 | 10/2003 | Murphy | 345/780 |
| 2004/0009788 A1 | 1/2004 | Mantyjarvi et al. | 455/550.1 |
| 2004/0135774 A1 | 7/2004 | La Monica | 345/174 |
| 2004/0140956 A1 | 7/2004 | Kushler et al. | |
| 2004/0160419 A1 | 8/2004 | Padgitt | 345/173 |
| 2004/0165924 A1 | 8/2004 | Griffin | 400/486 |
| 2004/0178994 A1 | 9/2004 | Kairls, Jr. | 345/173 |
| 2004/0181749 A1 | 9/2004 | Chellapilla et al. | |
| 2004/0183833 A1 | 9/2004 | Chua | 345/773 |
| 2004/0218963 A1 | 11/2004 | Van Diepen et al. | 400/472 |
| 2005/0024341 A1 | 2/2005 | Gillespie et al. | 345/173 |
| 2005/0169527 A1 | 8/2005 | Longe et al. | 382/177 |
| 2005/0190970 A1 | 9/2005 | Griffin | 382/209 |
| 2005/0253816 A1 | 11/2005 | Himberg et al. | 345/173 |
| 2005/0253818 A1 | 11/2005 | Nettamo | 345/173 |
| 2006/0007174 A1 | 1/2006 | Shen | 345/173 |
| 2006/0052885 A1 | 3/2006 | Kong | 700/84 |
| 2006/0053387 A1 | 3/2006 | Ording | 715/773 |
| 2006/0066590 A1 | 3/2006 | Ozawa et al. | 345/173 |
| 2006/0085757 A1 | 4/2006 | Andre et al. | 715/771 |
| 2006/0085767 A1 | 4/2006 | Hinckley et al. | |
| 2006/0161846 A1 | 7/2006 | Van Leeuwen | 715/702 |
| 2006/0181519 A1 | 8/2006 | Vernier et al. | 345/173 |
| 2006/0242607 A1 | 10/2006 | Hudson | |
| 2006/0253793 A1 | 11/2006 | Zhai et al. | |
| 2006/0274051 A1 | 12/2006 | Louge et al. | 345/173 |
| 2007/0061754 A1 | 3/2007 | Ardhanari et al. | 715/816 |
| 2007/0100890 A1* | 5/2007 | Kim | 707/104.1 |
| 2007/0174788 A1* | 7/2007 | Ording | 715/816 |
| 2008/0098331 A1* | 4/2008 | Novick et al. | 715/835 |
| 2008/0316183 A1 | 12/2008 | Westerman et al. | 345/173 |
| 2009/0195506 A1 | 8/2009 | Geidl et al. | 345/168 |
| 2009/0288044 A1* | 11/2009 | Matthews et al. | 715/863 |
| 2009/0292989 A1* | 11/2009 | Matthews et al. | 715/702 |
| 2010/0131880 A1* | 5/2010 | Lee et al. | 715/769 |
| 2011/0016390 A1* | 1/2011 | Oh et al. | 715/702 |
| 2011/0035696 A1* | 2/2011 | Elazari et al. | 715/773 |
| 2011/0209088 A1* | 8/2011 | Hinckley et al. | 715/810 |

FOREIGN PATENT DOCUMENTS

| | | | | |
|---|---|---|---|---|
| EP | 1 674 976 A2 | 6/2006 | | G06F 3/00 |
| GB | 2 332 293 A | 6/1999 | | G06F 3/023 |
| GB | 2 337 349 A1 | 11/1999 | | G06F 3/023 |
| GB | 2 351 639 A | 1/2001 | | G06F 3/033 |
| GB | 2 380 583 A | 4/2003 | | G06F 3/033 |
| GB | 2 402 105 A | 12/2004 | | G06F 3/033 |
| JP | 9 033278 | 2/1997 | | |
| JP | 10 171600 | 6/1998 | | |
| JP | 11 053093 A | 2/1999 | | G06F 3/02 |
| JP | 11 085380 | 3/1999 | | |
| JP | 11 119911 | 4/1999 | | |
| JP | 2000 231670 | 8/2000 | | |
| JP | 2004 110388 | 4/2004 | | |
| WO | WO 98/33111 A1 | 7/1998 | | G06F 3/023 |
| WO | WO 99/54807 A1 | 10/1999 | | G06F 3/033 |
| WO | WO 00/38042 A1 | 6/2000 | | G06F 3/033 |
| WO | WO 03/098417 A2 | 11/2003 | | G06F 3/00 |
| WO | WO 2004/051392 A2 | 6/2004 | | |
| WO | WO 2005/064442 A1 | 7/2005 | | G06F 3/02 |
| WO | WO 2006/003590 A2 | 1/2006 | | G06F 3/033 |
| WO | WO 2009/032483 A1 | 3/2009 | | G06F 3/048 |

OTHER PUBLICATIONS

Centroid, http://faculty,evansville.edu/ck6/tcenters/class/centroid.html, printed Apr. 28, 2006, 4 pages.

Day, B., "Will Cell Phones Render iPods Obsolete?" printed Dec. 12, 2005, 3 pages, http://weblogs.javanet/pub/wig/883.

Delta II™ Keypads, "Introducing the Ultimate Smartphone Keypad", printed Nov. 18, 2005, 2 pages, http://www.chicagologic.com.

DigitWireless, "Fastap™ Keypads Redefine Mobile Phones," printed Nov. 18, 2005, 9 pages, http://www/digitwireless.com.

DigitWireless, "Fastap™," Dec. 6, 2005, 5 pages, http://www.digitwireless.com/about/faq.html.

O'Neal, "Smart Phones with Hidden Keyboards," printed Nov. 18, 2005, 3 pages, http://msc.com/4250-6452_16-6229969-1.html.

Phoneyworld, "You Heard of Touch Screens Now Check Out Touch Keys" printed Nov. 18, 2005, 2 pages, http://www.phoneyworld.com.

Sears et al., "Data Entry for Mobile Devices Using Soft Keyboards: Understanding the Effects of Keyboard Size and User Tasks," Abstract, Int'l Journal of Human-Computer Interaction, 2003, vol. 16, No. 2, 1 page.

Solutions for Humans, "Compare Keyboards with the Keyboard Compatibility Chart, Learn more About Alternative Keyboards," printed Dec. 8, 2005, 5 pages, http://www.keyalt.com/kkeybrdp.htm.

Sony Ericsson Mobile Communications AB: "P900 User Guide" XP002479719, [Online], Sep. 2003, pp. 8, 16,17,20, 24-26, 42-45, 137, 98 pages, http://www.sonyericcson.com/downloads/P900_UG_R1b_EN.pdf.

"T9® Text Input for Keypad Devices," 1 page, http://tegic.com.

Textually, "LG Develops New Touch Pad Cell Phones" printed Nov. 18, 2005, 1 page, http://textually.org/textually/archives/2005/06/009903.htm.

Textually, "Microsoft New-Smart Phone Interface: Your Thumb," printed Nov. 18, 2005, 2 pages, http://www.textually.org.

Textually, "Samsung Releases Keyboard Phone in US," printed Nov. 18, 2005, 1 page, http://www.textually.org/textually/archives/2005/11/010482.htm.

WikiPodLinux,"Text Input Concepts, " Dec. 2005, printed Jun. 17, 2008, 3 pages, http://web.archive.org/web/20051211165254/http://ipodlinux.org/Text_Input_Concepts.

(56) References Cited

OTHER PUBLICATIONS

WikiPodLinux,"Text Input (legacy)," downloaded Dec. 5, 2005, 8 pages, http://ipodlinux.org/Text_Input_%28legacy%29.

WikiPodLinux,"Text Input Methods," printed Dec. 5, 2005, 5 pages, http://ipodlinux.org/Text_Input_Methods.

WikiPodLinux,"Four-Button Keyboard," printed Dec. 5, 2005, 2 pages, http://ipodlinux.org/Four-Button_Keyboard.

Invitation to Pay Additional Fees dated Jan. 2, 2008, received in International Application No. PCT/US2007/060119, which corresponds to U.S. Appl. No. 11/459,606.

International Search Report and Written Opinion dated Apr. 11, 2008, received in International Application No. PCT/US2007/060119, which corresponds to U.S. Appl. No. 11/459,606.

Invitation to Pay Additional Fees dated Jun. 23, 2008, received in International Application No. PCT/US2007/088904, which corresponds to U.S. Appl. No. 11/961,663.

International Search Report and Written Opinion dated Sep. 15, 2008, received in International Application No. PCT/US2007/088904, which corresponds to U.S. Appl. No. 11/961,663.

Office Action dated May 28, 2009, received in U.S. Appl. No. 11/459,606.

Office Action dated Aug. 16, 2010, received in Chinese Application No. 200780006621.9, which corresponds to U.S. Appl. No. 11/459,606.

Office Action dated Oct. 10, 2008, received in European Patent Application No. 07 709 955.4, which corresponds to U.S. Appl. No. 11/459,606.

Office Action dated Jul. 31, 2009, received in European Patent Application No. 07 709 955.4, which corresponds to U.S. Appl. No. 11/459,606.

Office Action dated Aug. 31, 2010, received in Korean Patent Application No. 10-2008-7019114, which corresponds to U.S. Appl. No. 11/459,606.

Office Action dated May 22, 2009, received in U.S. Appl. No. 11/459,615.

Final Office Action dated Dec. 8, 2009, received in U.S. Appl. No. 11/459,615.

Office Action dated Apr. 13, 2010, received in U.S. Appl. No. 11/459,615, 11 pages.

Office Action dated Sep. 17, 2008, received in U.S. Appl. No. 11/228,700, 50 pages.

Office Action dated May 12, 2009, received in U.S. Appl. No. 11/228,700, 14 pages.

Office Action dated Jul. 24, 2009, received in Australian Patent Application No. 2006295354, which corresponds to U.S. Appl. No. 11/228,700, 2 pages.

Office Action dated Jan. 29, 2010, received in Chinese Application for Invention No. 200680033890.X, which corresponds to U.S. Appl. No. 11/228,700, 3 pages.

Office Action dated Jan. 11, 2010, received in Korean Patent Application No. 10-2008-7006262, which corresponds to U.S. Appl. No. 11/228,700, 11 pages.

Office Action dated Aug. 25, 2010, received in Korean Patent Application No. 10-2008-7006262, which corresponds to U.S. Appl. No. 11/228,700.

Office Action dated Jun. 10, 2010, received in U.S. Appl. No. 11/696,701, 35 pages.

International Search Report and Written Opinion dated Mar. 23, 2011, received in International Application No. PCT/US2010/062318, which corresponds to U.S. Appl. No. 12/790,479.

Technology Loan Catalog, "Devices," printed Jun. 6, 2008, 9 pages, http://www.tsbvi.edu/outreach/techloan/catalog.html.

Office Action dated Nov. 18, 2010, received in U.S. Appl. No. 11/961,663, 35 pages (Novick).

Notice of Acceptance dated Oct. 8. 2010, received in Austrlian Patent Application No. 2006295354, which corresponds to U.S. Appl. No. 11/228,700, 2 paces (Ording).

Office Action dated Dec. 15, 2011, received in European Patent Application No. 06801347.3, which corresponds to U.S. Appl. No. 11/228,700, 5 pages (Ording).

Office Action dated May 22, 2012, received in European Patent Application No. 06 801 347.3, which corresponds to U.S. Appl. No. 11/228,700, 5 pages (Ording).

Office Action dated Feb. 28, 2011, received in Japanese Patent Application No. 2008 531107, which corresponds to U.S. Appl. No. 11/228,700, 3 pages (Ording).

Office Action dated Nov. 4, 2011, received in Japanese Patent Application No. 2005 531107, which corresponds to U.S. Appl. No. 11/228,700, 4 pages (Ording).

Office Action dated Dec. 11, 2010, received in Korean Patent Application No. 10-2010-7022243, which corresponds to U.S. Appl. No. 12/242,868, 3 pages (Ording).

Notice of Allowance dated Sep. 28, 2011, received in Koran Patent Application No. 10-2010-7022243, which corresponds to U.S. Appl. No. 11/228,700, 3 pages (Ording).

Final Office Action dated Nov. 26, 2010, received in U.S. Appl. No. 11/696,701, 18 pages (Ording).

Office Action dated Dec. 22, 2011, received in U.S. Appl. No. 11/696,701, 13 pages (Ording).

Final Office Action dated Jul. 27, 2012, received in U.S. Appl. No. 11/696,701, 15 pages (Ording).

\* cited by examiner

DEVICE, METHOD, AND GRAPHICAL USER INTERFACE FOR ACCESSING ALTERNATE KEYS

RELATED APPLICATIONS

This application claims priority to U.S. Provisional Application No. 61/292,500, filed Jan. 6, 2010, entitled "Device, Method, and Graphical User Interface for Accessing Alternate Keys," which is incorporated herein by reference in its entirety.

TECHNICAL FIELD

The disclosed embodiments relate generally to electronic devices with touch-sensitive surfaces, and more particularly, to electronic devices with touch screen displays that receive input for activating the displaying of alternate keys associated with a default key.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display.

Exemplary manipulations include entering characters using one or more soft keyboards. A user may need to perform such manipulations on user interface objects in any program or application where character input is needed.

But existing methods for using such soft keyboards are cumbersome and inefficient. For example, accessing alternate keys for a default key on a soft keyboard is tedious and creates a significant cognitive burden on a user. In addition, some conventional methods take longer than necessary to complete a task, thereby wasting a user's time and a device's power reserve, which can be particularly important consideration for battery-operated devices.

SUMMARY

Accordingly, there is a need for computing devices with faster, more efficient methods and interfaces for accessing alternate keys for a default key on a soft keyboard. Such methods and interfaces may complement or replace conventional methods for accessing alternate keys for a default key on a soft keyboard. Such methods and interfaces reduce the cognitive burden on a user and produce a more efficient human-machine interface. For battery-operated computing devices, such methods and interfaces conserve power and increase the time between battery charges.

The above deficiencies and other problems associated with user interfaces for computing devices with touch-sensitive displays (also known as a "touch screen" or "touch screen display") are reduced or eliminated by the disclosed devices. In some embodiments, the device is a desktop computer. In some embodiments, the device is portable (e.g., a notebook computer, tablet computer, or handheld device). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In accordance with some embodiments, a method is performed at a multifunction device with a touch-sensitive display. The method includes: displaying a text entry region and a soft keyboard having a plurality of default keys; detecting a contact at a first location on the touch-sensitive display that corresponds to an activation region associated with a respective default key, wherein the respective default key has a plurality of alternate keys, and detecting an immediate subsequent movement of the contact on the touch-sensitive display; in response to detecting the movement of the contact, while continuing to display the plurality of default keys of the soft keyboard, displaying an array of keys including the plurality of alternate keys for the respective default key, each key in the array having an associated activation region; detecting liftoff of the contact at a second location on the touch-sensitive display; and in response to detecting the liftoff of the contact: when the second location corresponds to an activation region that is associated with a respective alternate key in the array, ceasing to display the array and inserting a character associated with the respective alternate key into the text entry region; and when the second location corresponds to a region of the touch-sensitive display that is not an activation region for any of the keys in the array, ceasing to display the array without inserting any character into the text entry region.

In accordance with some embodiments, a multifunction device includes a touch-sensitive display, one or more processors, memory, and one or more programs; the one or more programs are stored in the memory and configured to be executed by the one or more processors and the one or more programs include instructions for performing the operations of the method described above. In accordance with some embodiments, a graphical user interface on a multifunction device with a touch-sensitive display, a memory, and one or more processors to execute one or more programs stored in the memory includes one or more of the elements displayed in the method described above, which are updated in response to inputs, as described in the method above. In accordance with some embodiments, a computer readable storage medium has stored therein instructions which when executed by a multifunction device with a touch-sensitive display, cause the device to perform the operations of the method described above. In accordance with some embodiments, a multifunction device includes: a touch-sensitive display; and means for performing the operations of the method described above. In accordance with some embodiments, an information processing apparatus, for use in a multifunction device with a touch-sensitive display, includes means for performing the operations of the method described above.

Thus, multifunction devices with touch screen displays are provided with faster, more efficient methods and interfaces for accessing alternate keys to a default key on a soft keyboard, thereby increasing the effectiveness, efficiency, and user satisfaction with such devices. Such methods and interfaces may complement or replace conventional methods for accessing alternate keys to a default key on a soft keyboard.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
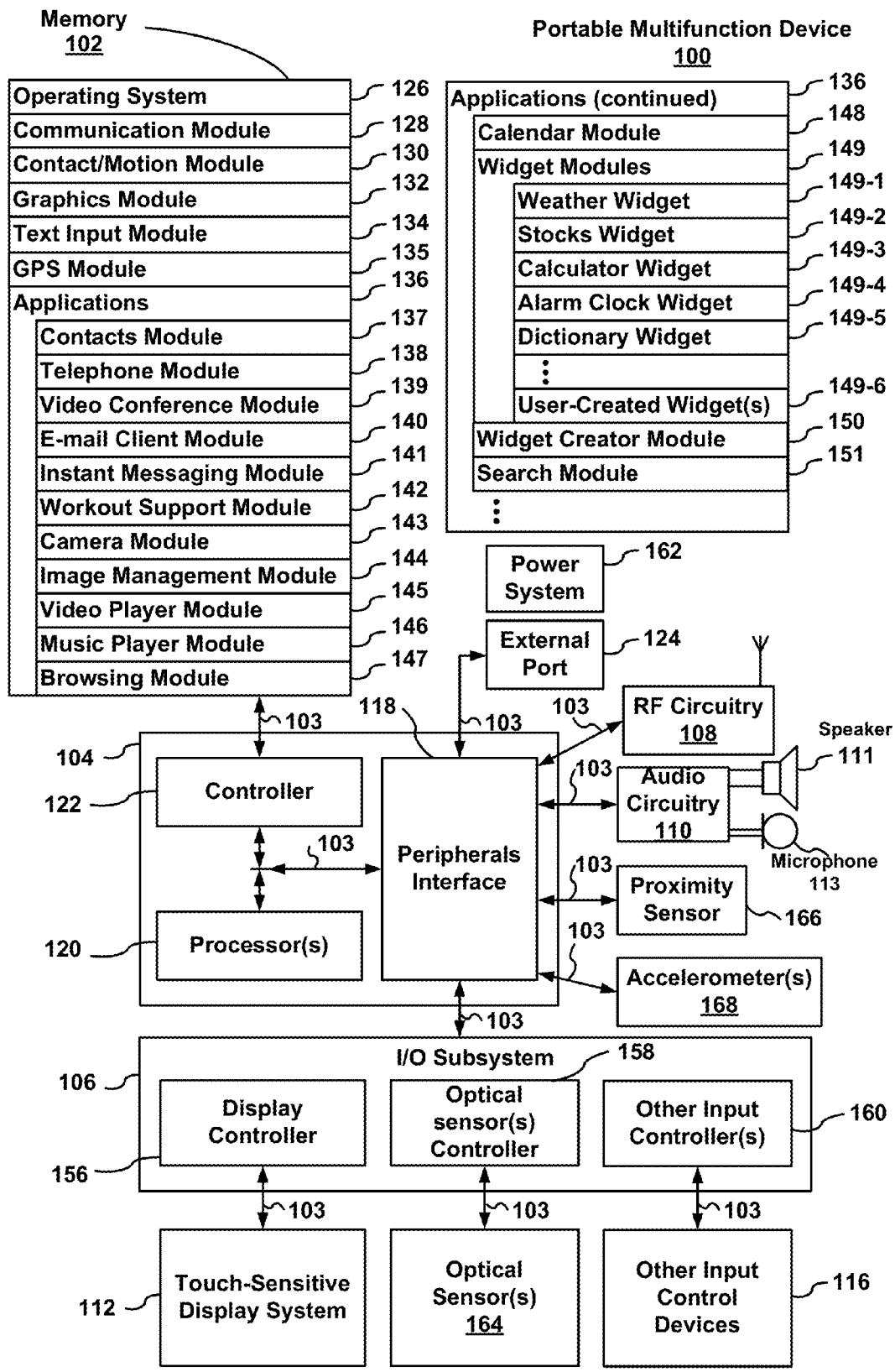
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As used herein, the term "resolution" of a display refers to the number of pixels (also called "pixel counts" or "pixel resolution") along each axis or in each dimension of the display. For example, a display may have a resolution of 320×480 pixels. Furthermore, as used herein, the term "resolution" of a multifunction device refers to the resolution of a display in the multifunction device. The term "resolution" does not imply any limitations on the size of each pixel or the spacing of pixels. For example, compared to a first display with a 1024×768-pixel resolution, a second display with a 320×480-pixel resolution has a lower resolution. However, it should be noted that the physical size of a display depends not only on the pixel resolution, but also on many other factors, including the pixel size and the spacing of pixels. Therefore, the first display may have the same, smaller, or larger physical size, compared to the second display.

As used herein, the term "video resolution" of a display refers to the density of pixels along each axis or in each dimension of the display. The video resolution is often measured in a dots-per-inch (DPI) unit, which counts the number of pixels that can be placed in a line within the span of one inch along a respective dimension of the display.

Embodiments of computing devices, user interfaces for such devices, and associated processes for using such devices are described. In some embodiments, the computing device is a portable communications device, such as a mobile telephone, that also contains other functions, such as PDA and/or music player functions. Exemplary embodiments of portable multifunction devices include, without limitation, the iPhone® and iPod Touch® devices from Apple Inc. of Cupertino, Calif. Other portable devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, a computing device that includes a display and a touch-sensitive surface is described. It should be understood, however, that the computing device may include one or more other physical user-interface devices, such as a physical keyboard, a mouse and/or a joystick.

The device supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference in their entireties. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
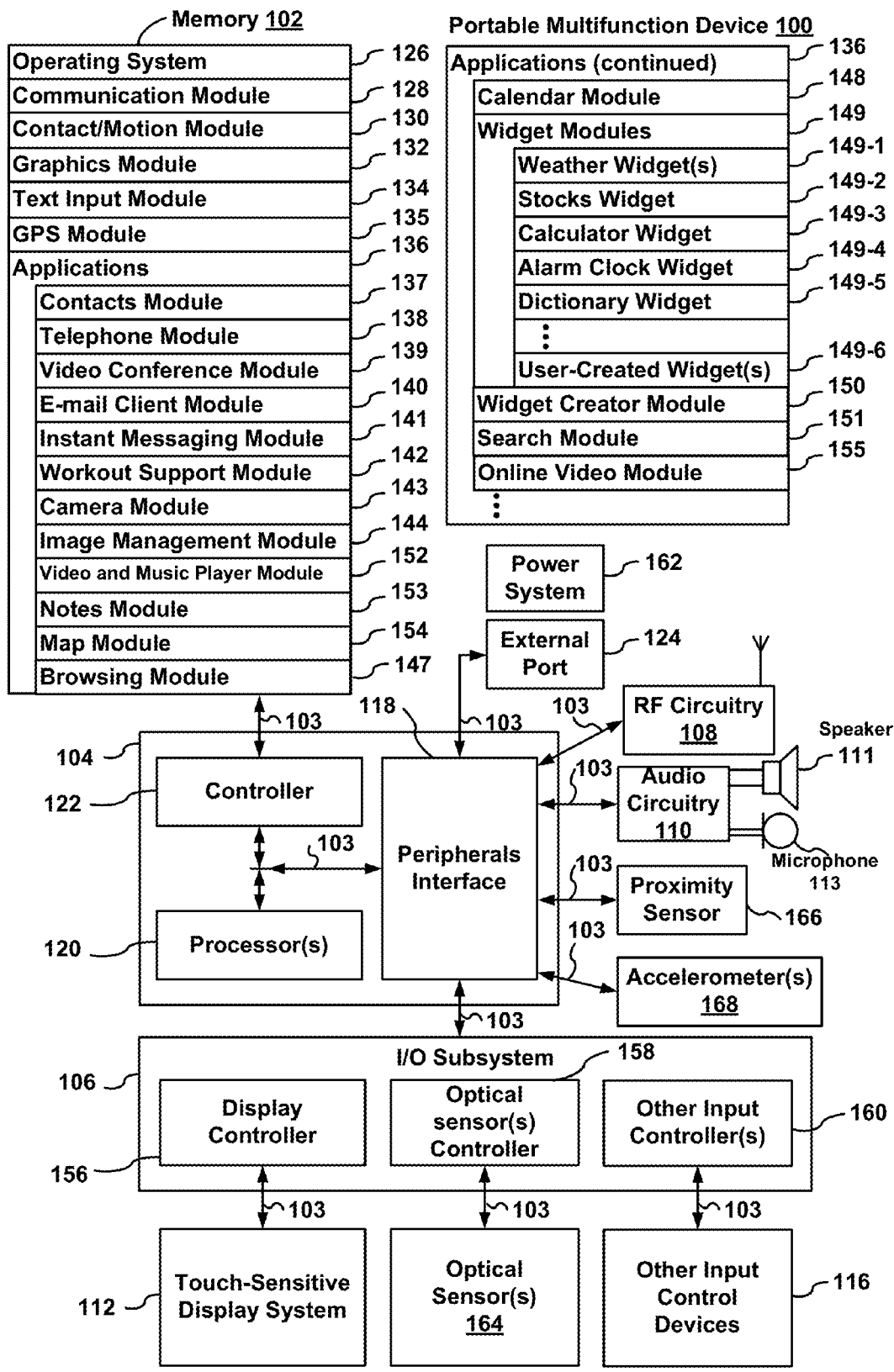

Attention is now directed toward embodiments of portable devices with touch-sensitive displays. FIGS. 1A and 1B are block diagrams illustrating portable multifunction devices 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIGS. 1A and 1B may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2). A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. Patents: U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from portable device 100, whereas touch sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

In some embodiments, device 100 may include a physical or virtual wheel (e.g., a click wheel) as input control device 116. A user may navigate among and interact with one or more graphical objects (e.g., icons) displayed in touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by input controller 160 as well as one or more of the modules and/or sets of instructions in memory 102. For a virtual click wheel, the click wheel and click wheel controller may be part of touch screen 112 and display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIGS. 1A and 1B show an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 may also include one or more proximity sensors 166. FIGS. 1A and 1B show proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 may also include one or more accelerometers 168. FIGS. 1A and 1B show accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
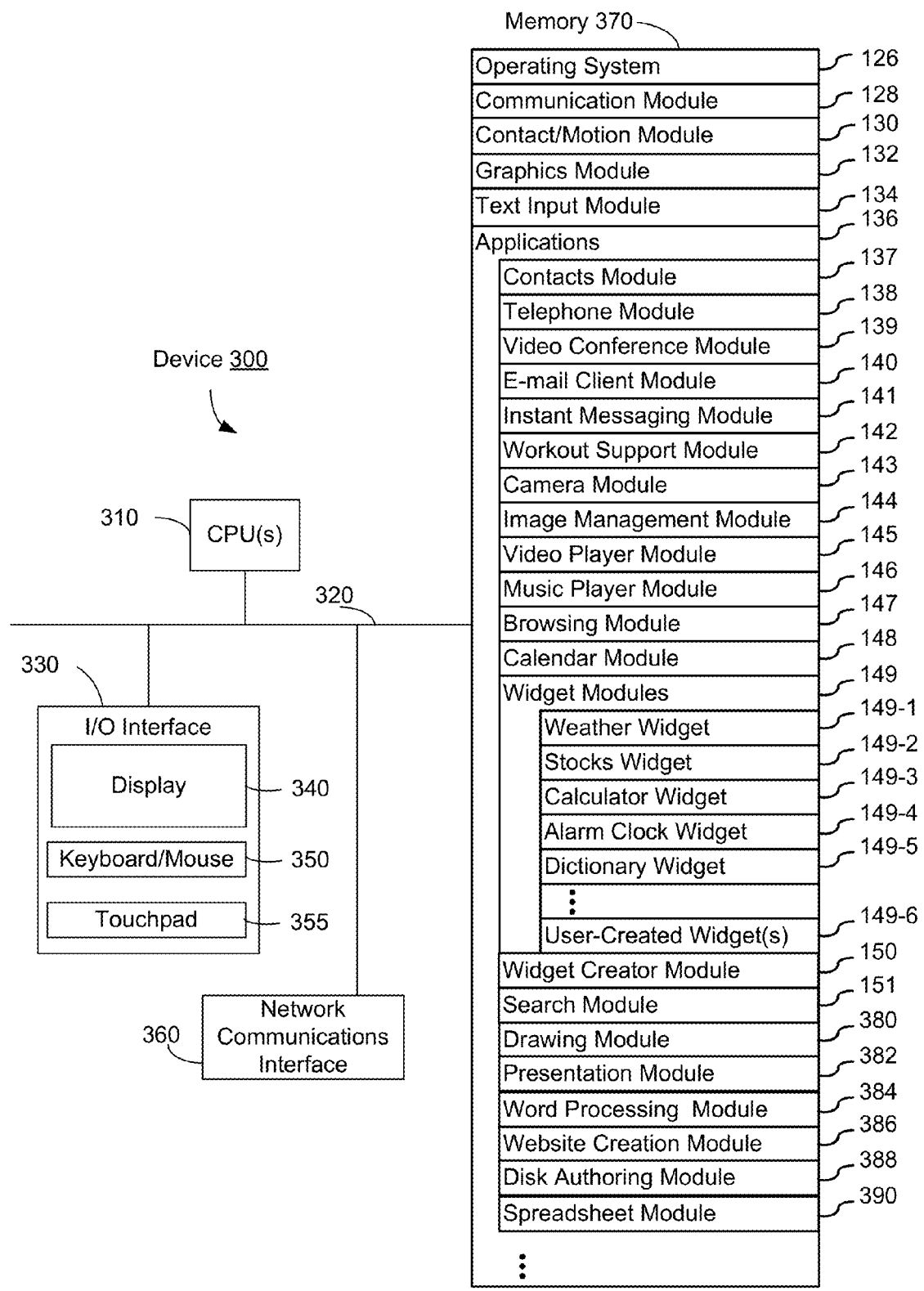
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A, 1B and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detects contact on a touchpad. In some embodiments, contact/motion module 130 and controller 160 detects contact on a click wheel.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- video player module 145;
- music player module 146;
- browser module 147;
- calendar module 148;
- widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module 145 and music player module 146;
- notes module 153;
- map module 154; and/or
- online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with touch screen 112, display controller 156, contact module 130, graphics module 132, audio circuitry 110, and speaker 111, video player module 145 includes executable instructions to display, present or otherwise play back videos (e.g., on touch screen 112 or on an external, connected display via external port 124).

In conjunction with touch screen 112, display system controller 156, contact module 130, graphics module 132, audio circuitry 110, speaker 111, RF circuitry 108, and browser module 147, music player module 146 includes executable instructions that allow the user to download and play back recorded music and other sound files stored in one or more file formats, such as MP3 or AAC files. In some embodiments, device 100 may include the functionality of an MP3 player, such as an iPod (trademark of Apple Inc.).

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1C:
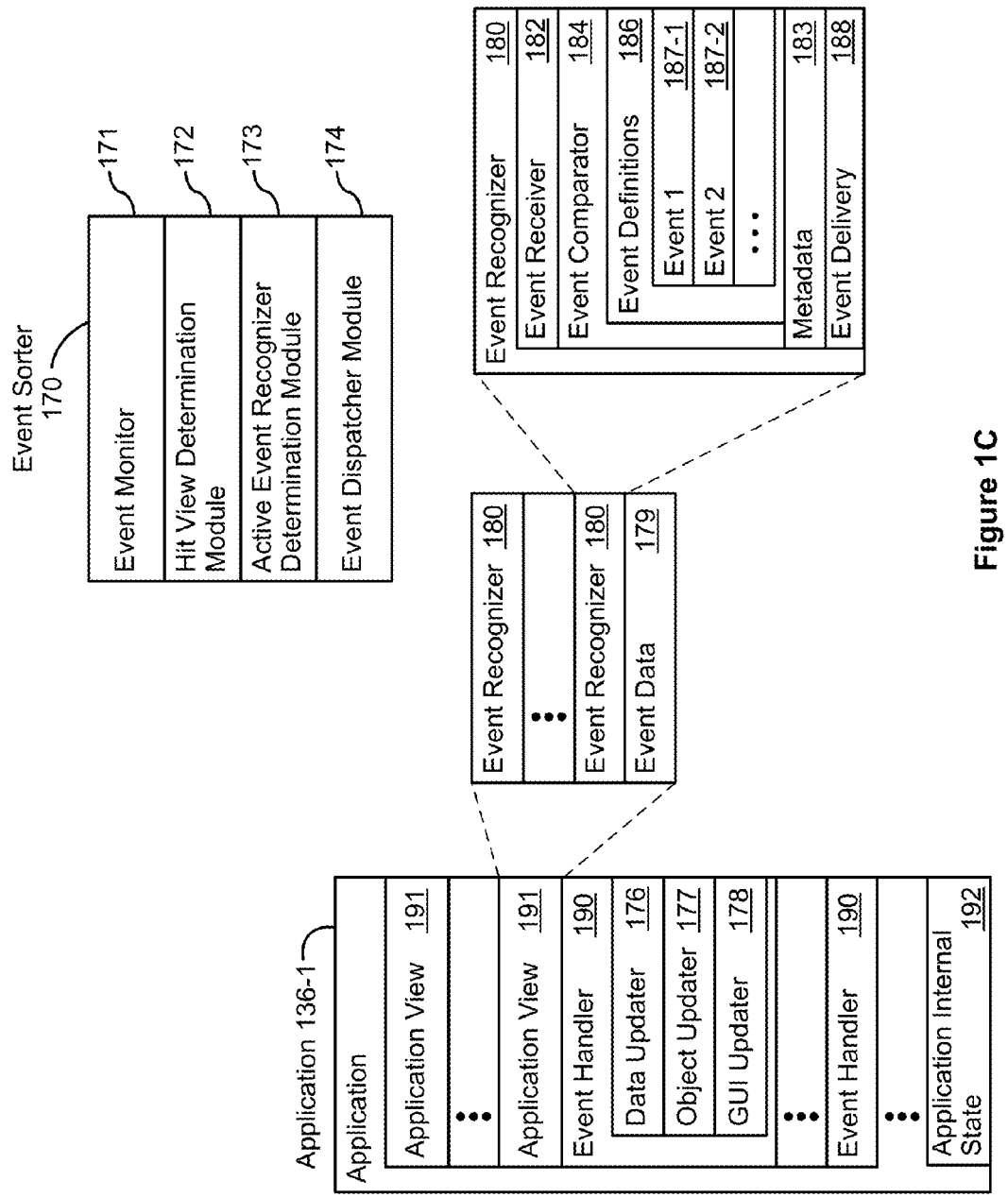
FIG. 1C is a block diagram illustrating exemplary components for event handling in accordance with some embodiments.

FIG. 1C is a block diagram illustrating exemplary components for event handling in accordance with some embodiments. In some embodiments, memory 102 (in FIGS. 1A and 1B) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is(are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
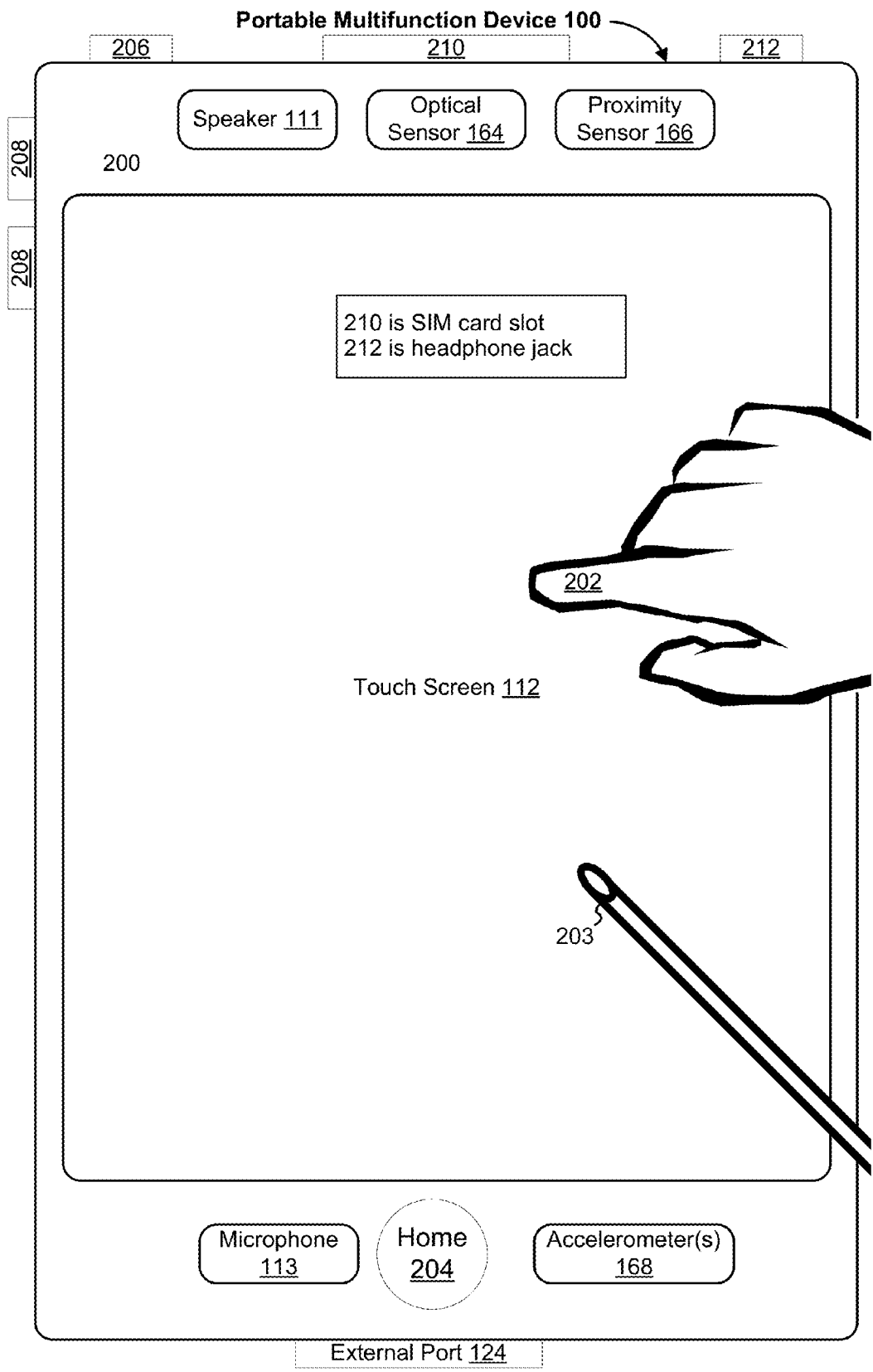
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

Figure 4A:
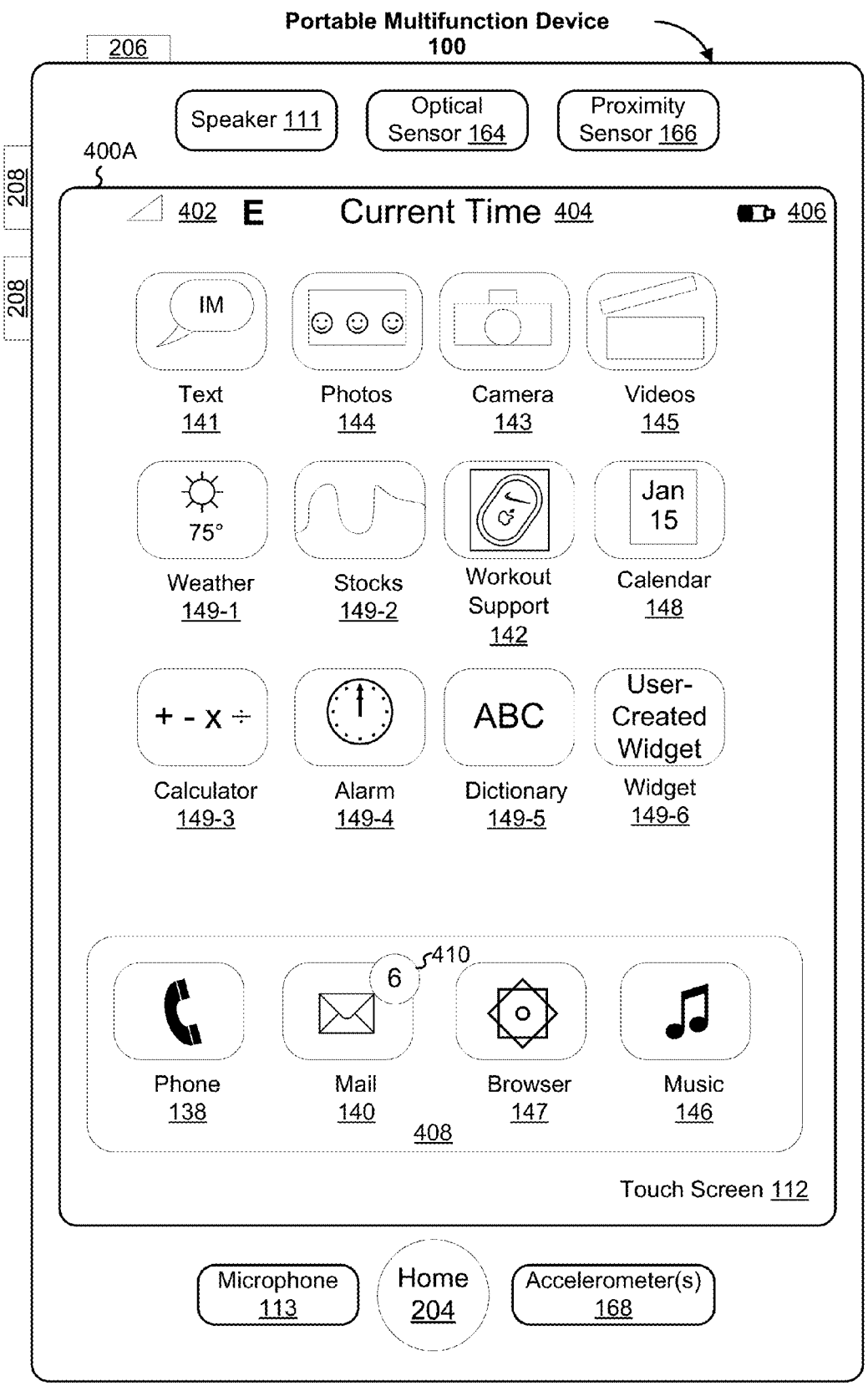
FIGS. 4A and 4B illustrate exemplary user interfaces for a menu of applications on a portable multifunction device in accordance with some embodiments.
Figure 4B:
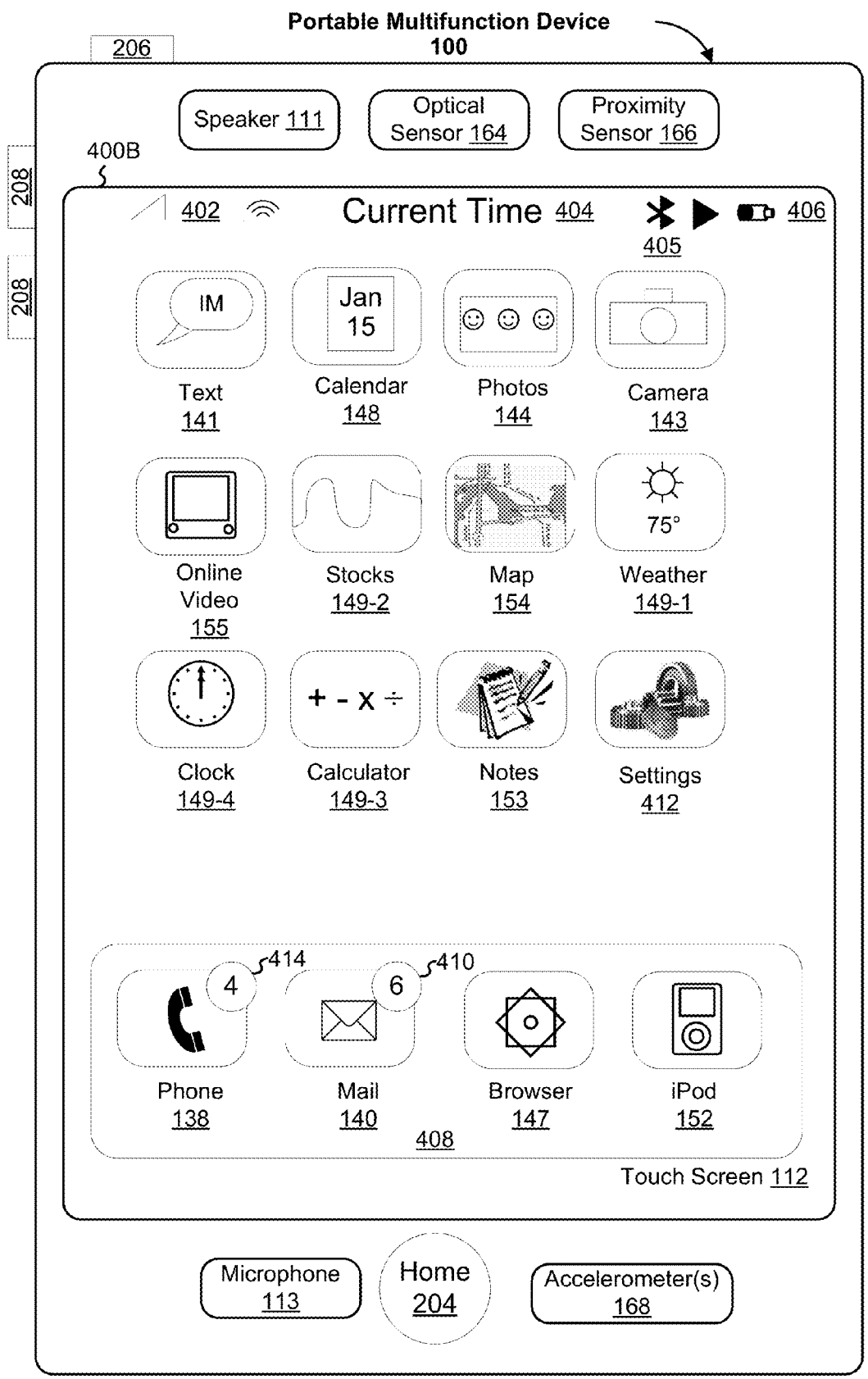

FIGS. 4A and 4B illustrate exemplary user interfaces for a menu of applications on portable multifunction device 100 in accordance with some embodiments. Similar user interfaces may be implemented on device 300. In some embodiments, user interface 400A includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
   Phone 138, which may include an indicator 414 of the number of missed calls or voicemail messages;
   E-mail client 140, which may include an indicator 410 of the number of unread e-mails;
   Browser 147; and
   Music player 146; and
Icons for other applications, such as:
   IM 141;
   Image management 144;
   Camera 143;
   Video player 145;
   Weather 149-1;
   Stocks 149-2;
   Workout support 142;
   Calendar 148;
   Calculator 149-3;
   Alarm clock 149-4;
   Dictionary 149-5; and
   User-created widget 149-6.

In some embodiments, user interface 400B includes the following elements, or a subset or superset thereof:
   402, 404, 405, 406, 141, 148, 144, 143, 149-3, 149-2, 149-1, 149-4, 410, 414, 138, 140, and 147, as described above;
   Map 154;
   Notes 153;
   Settings 412, which provides access to settings for device 100 and its various applications 136, as described further below;
   Video and music player module 152, also referred to as iPod (trademark of Apple Inc.) module 152; and
   Online video module 155, also referred to as YouTube (trademark of Google Inc.) module 155.

Attention is now directed towards embodiments of user interfaces ("UI") and associated processes that may be implemented on a multifunction device with a display and a touch-sensitive surface, such as device 300 or portable multifunction device 100.

FIGS. 5A-5G illustrate exemplary user interfaces for accessing alternate keys for a default key in accordance with some embodiments. The user interfaces in these figures are used to illustrate the processes described below, including the processes in FIGS. 6A-6C.

In FIGS. 5A-5I, some finger contact movement sizes may be exaggerated for illustrative purposes. No depiction in the figures bearing on finger contact movements should be taken as a requirement or limitation for the purpose of understanding sizes and scale associated with the methods and devices disclosed herein.

UI 500A (FIG. 5A) depicts an exemplary text input user interface for a notes application (e.g., notes module 153) on the touch screen 112 of device 100. In this example, the UI 500A includes a text entry region 502 and a QWERTY soft keyboard 504 below the text entry region 502. The text entry region 502 may include input text 506 with text 506-1 and a cursor 508 at position 508-A. The soft keyboard 504 includes one or more soft keys 510 that are default for the soft keyboard 504. Some of the soft keys 510 are associated with a respective Latin letter. For example, soft key 510-A is associated with the letter "E." One or more of the soft keys 510 may be associated with one or more respective alternate keys. For example, a key 510 associated with a letter can have alternate keys associated with that letter with respective diacritical marks.

UI 500B (FIG. 5B) illustrates a contact 512 on the touch screen 112. In this example, the contact 512 is at a location 512-A on the touch screen 112 corresponding to the location of soft key 510-A, which also corresponds to the activation region of soft key 510-A. In some embodiments, the activation region of a soft key 510 is the area indicated by the periphery of the key 510 as displayed on the touch screen 112.

UI 500C (FIG. 5C) illustrates immediate subsequent movement of contact 512 (e.g., upward) in the UI on touch screen 112, from location 512-A to location 512-B. During the movement, contact 512 remains in contact with the touch screen 112. In this example, the movement of the contact follows an approximately straight line.

UI 500D (FIG. 5D) illustrates a pause of the movement of the contact 512 at location 512-B. During the pause, the contact 512 remains in contact with the touch screen 112. UI 500D also illustrates a plurality of alternate keys 514 for key 510-A being displayed on the touch screen 112 in response to the movement of contact 512 to location 512-B. The alternate keys 514 are displayed as an array (e.g., a horizontal array, a vertical array, or a two-dimensional array) of soft keys in the vicinity of key 510-A. The alternate keys 514 include a key 514-A for the original letter "E" associated with key 510-A and keys 514-B to 514-F for the letter "E" with respective diacritical marks.

In some embodiments, the alternate keys 514-A thru 514-F are displayed within the array in an ordering or positioning that is determined based at least in part on the language with which the soft keyboard 504 is associated. For example, the ordering or positioning can be based at least in part on which diacritical marks (or the absence of a diacritical mark) are most commonly added to the letter "E" within the language; the respective alternate keys associated with the absence of a diacritical mark (i.e., the original unmodified letter "E" associated with key 510-A) and with the commonly added diacritical marks or for the letter "E" are displayed closer to the default key 510-A. Further, in some embodiments, the ordering or positioning can be determined based at least in further part on the usage frequencies of the letter "E" with and without diacritical marks, with the keys associated with the diacritical mark variations of the letter "E" that are entered more often by the user displayed closer to the default key 510-A.

UI 500E (FIG. 5E) illustrates movement of contact 512 across the touch-screen 112, from location 512-B to a location 512-C corresponding to the location of alternate key 514-B, which corresponds to the activation region of the alternate key 514-B. In some embodiments, the activation region of an alternate key 514 is the area indicated by the periphery of the alternate key 514 as displayed on the touch screen 112. Alternate key 514-B is associated with the letter "E" with a macron diacritic. If the contact 512 is broken from the touch screen 112 at the location of the alternate key 514-B, a character corresponding to the letter "E" with a macron is input into input text 506 at cursor location 508-A, and the cursor 508 advances to another location.

UI 500F (FIG. 5F) illustrates a result of the breaking of the contact 512 from touch screen 112 at location 512-C. The alternate keys 514 ceases to be displayed on the touch screen 112. A character 516 corresponding to the letter "E" with a macron is input into input text 506 (text 506-1 changes to text 506-2), and cursor 508 advances to location 508-B. In some embodiments, in response to detecting a gesture that corresponds to a desired accent on a respective default key for a character—e.g., an upward gesture to the right for a rightward accent or an upward gesture to the left for a leftward accent—the character with the corresponding accent is input, independent of whether the alternate keys 514 are displayed.

UI 500G (FIG. 5G) illustrates movement of contact 512 across the touch screen 112 from location 512-B to a location 512-D that does not correspond to a location of any of the alternate keys 514. If contact 512 is broken from touch screen 112 at location 512-D, alternate keys 514 cease to be displayed and no new character is inputted into input text 506 (i.e., text 506-1 remain as is); UI 500G changes back to UI 500A.

UI 500H (FIG. 5H) illustrates immediate subsequent movement of contact 512 downward in the UI on touch screen 112, from location 512-A to location 512-E.

UI 500I (FIG. 5I) illustrates the hiding of keyboard 504. In response to the immediate subsequent downward movement, the keyboard 504 is hidden (i.e., ceases to be displayed) while text entry region 502 remains displayed. In some embodiments, the keyboard 504 is "unhidden" in response to a contact anywhere on the touch screen 112 while the keyboard 504 is hidden.

Figure 6A:
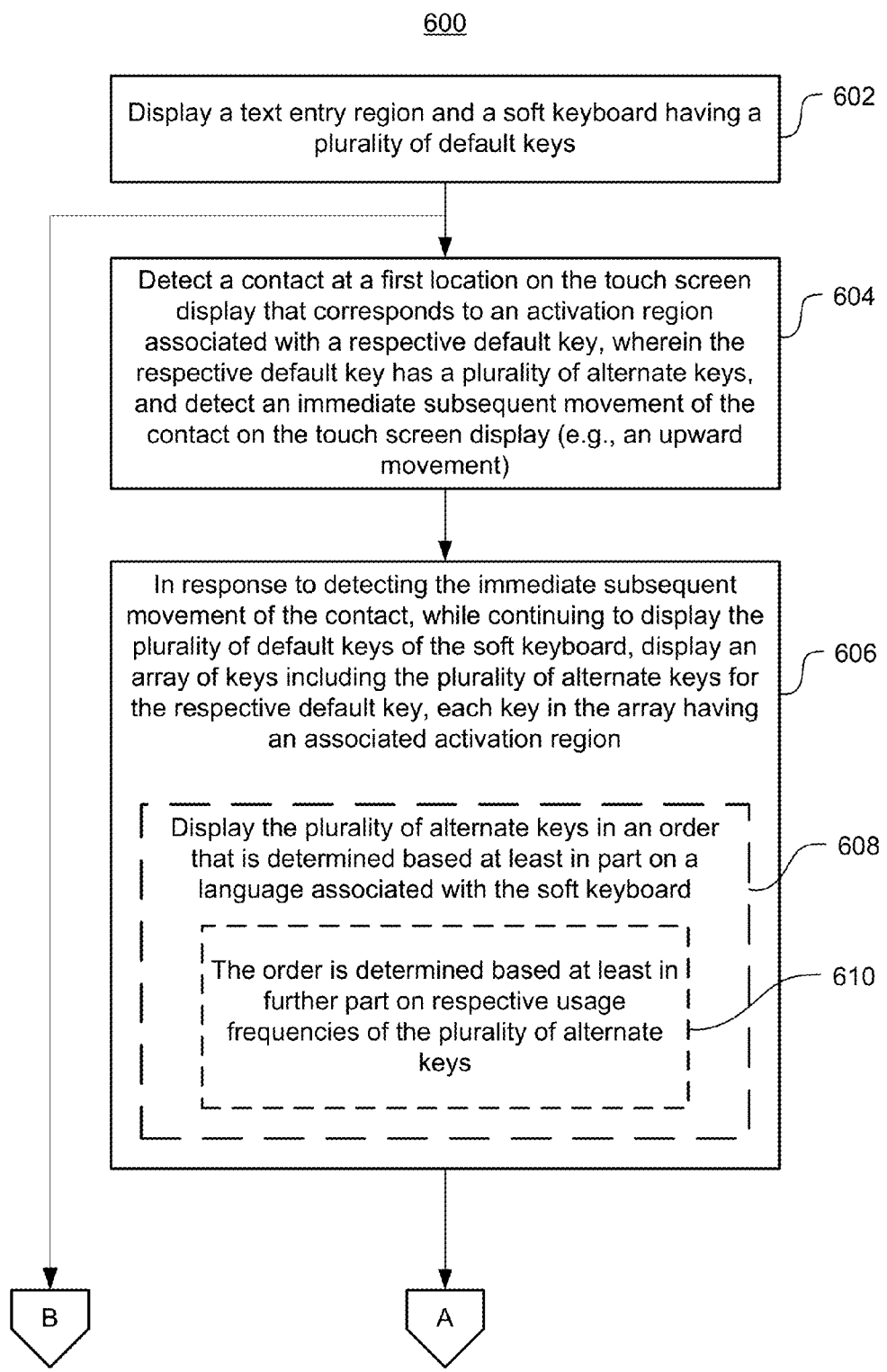
FIGS. 6A-6C are flow diagrams illustrating a method of accessing alternate keys in accordance with some embodiments.
Figure 6B:
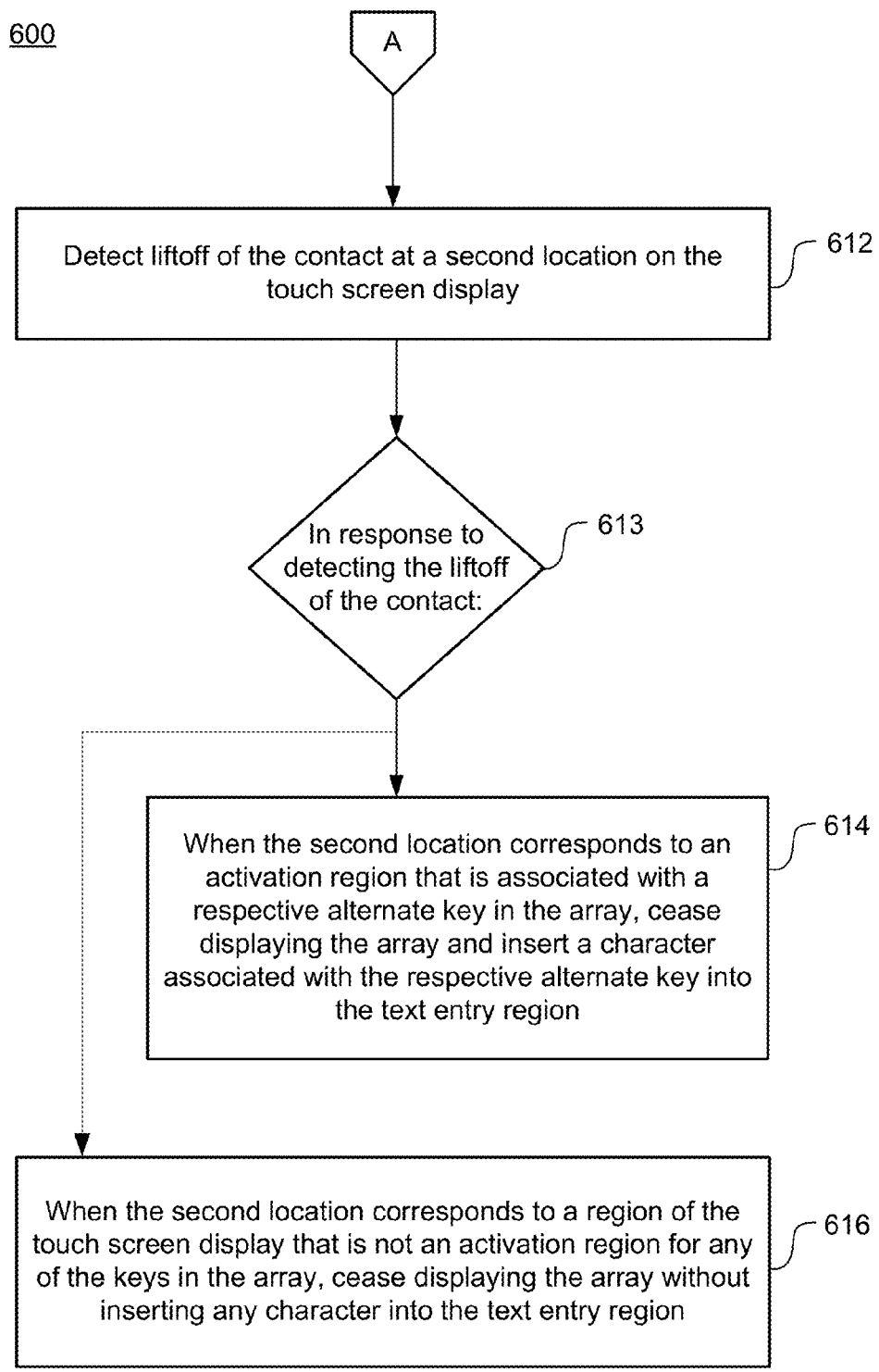
Figure 6C:
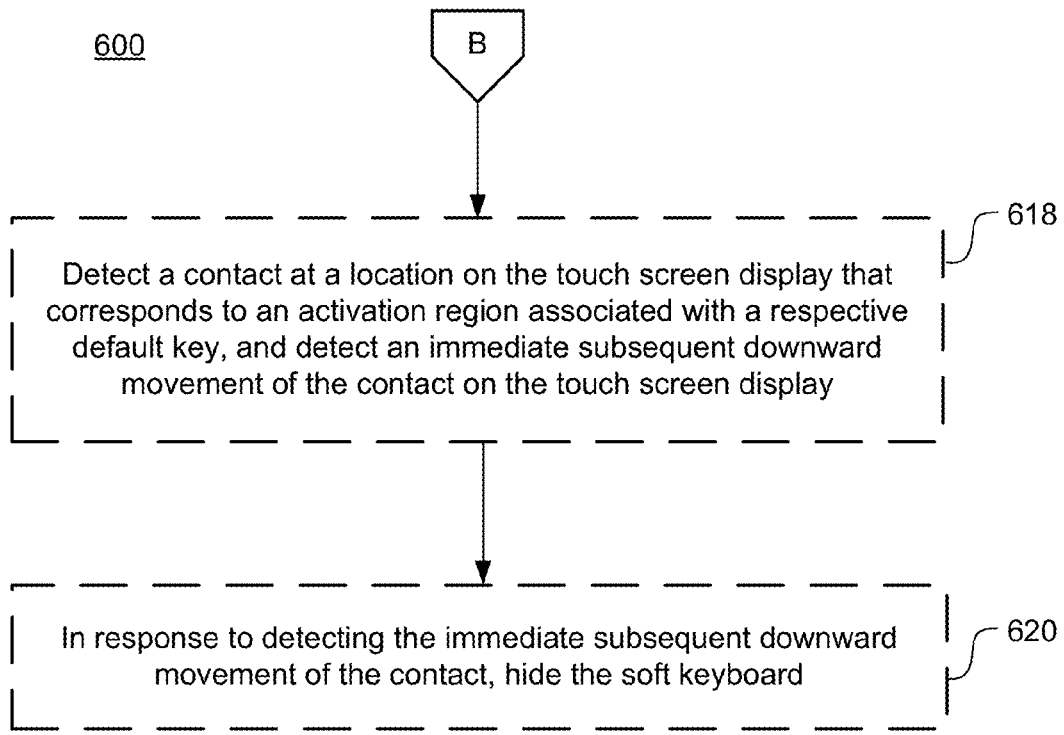

FIGS. 6A-6C are flow diagrams illustrating a method 600 of accessing alternate keys for a default key in accordance with some embodiments. The method 600 is performed at a multifunction device (e.g., device 300, FIG. 3, or portable multifunction device 100, FIG. 1) with a touch screen display and the touch-sensitive surface is on the display. Some operations in method 600 may be combined and/or the order of some operations may be changed.

As described below, the method 600 provides an intuitive way to access alternate keys for a default key. The method reduces the cognitive burden on a user when accessing alternate keys for a default key, thereby creating a more efficient human-machine interface. For battery-operated computing devices, enabling a user to access alternate keys for a default key faster and more efficiently conserves power and increases the time between battery charges.

The device displays (602) a text entry region and a soft keyboard having a plurality of default keys. For example, in FIG. 5A, UI 500A includes a text entry region 502 and a QWERTY soft keyboard 504 below the text entry region 502.

The QWERTY soft keyboard 504 includes a plurality of keys 510 that are default for the QWERTY keyboard 504. The default keys 510 include keys associated with the Latin alphabet without any diacritical marks. For a non-QWERTY keyboard, the set of default keys may be different.

In some embodiments, more than one soft keyboard is available on a device. For example, a device can have different keyboards for different languages and/or input methods, each keyboard with its own set of default keys.

In some embodiments, a keyboard is associated with multiple languages, with the available alternate keys differing by language. For example, a QWERTY keyboard can be used for multiple languages, but the set of available alternate keys for the QWERTY keyboard can differ by the language for which the QWERTY keyboard is used at the moment.

Each key 510 has a respective activation region; in some embodiments, the periphery of the respective key 510 indicates its respective activation region.

Figure 5A:
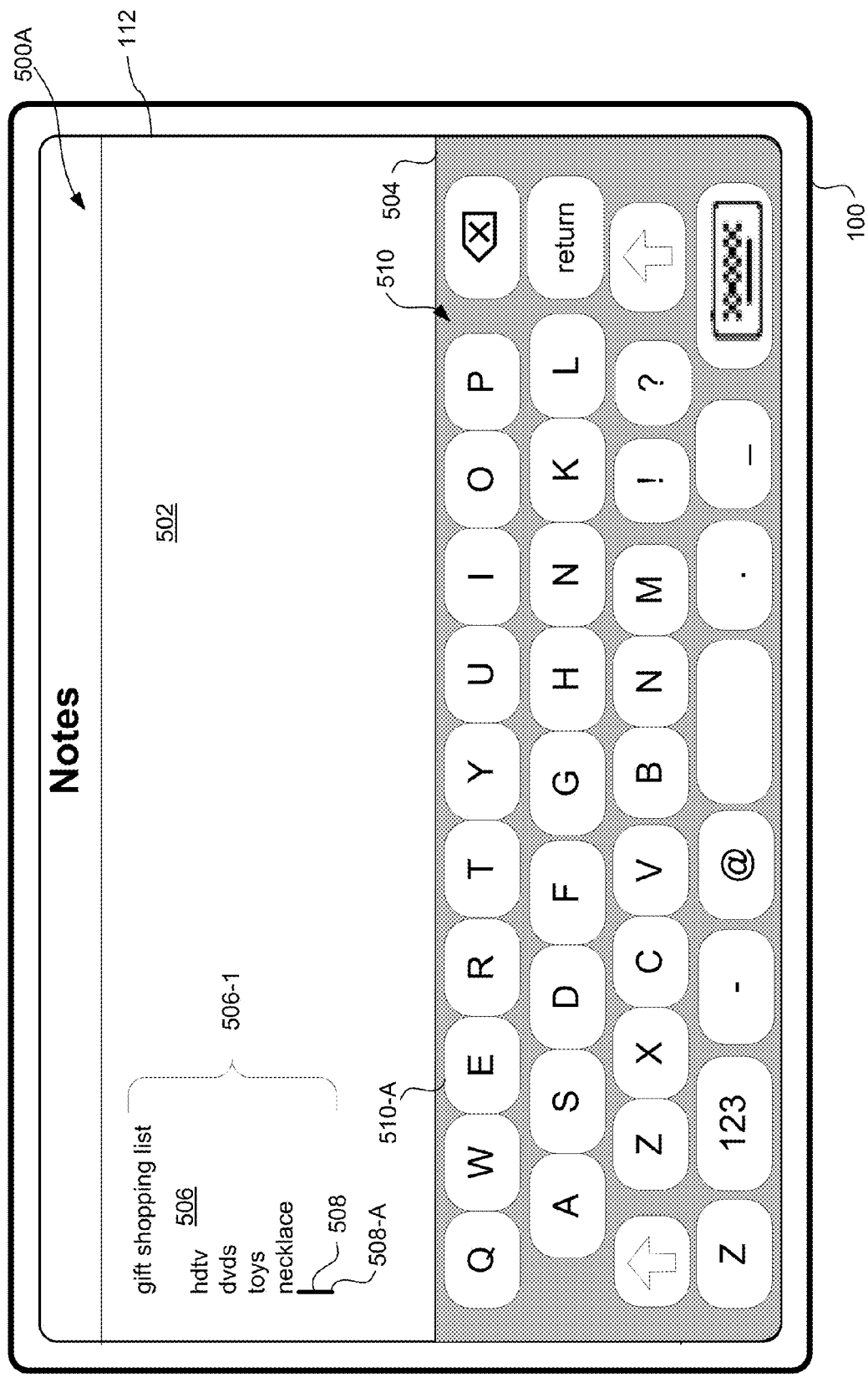
FIGS. 5A-5I illustrate exemplary user interfaces for accessing alternate keys in accordance with some embodiments.
Figure 5B:
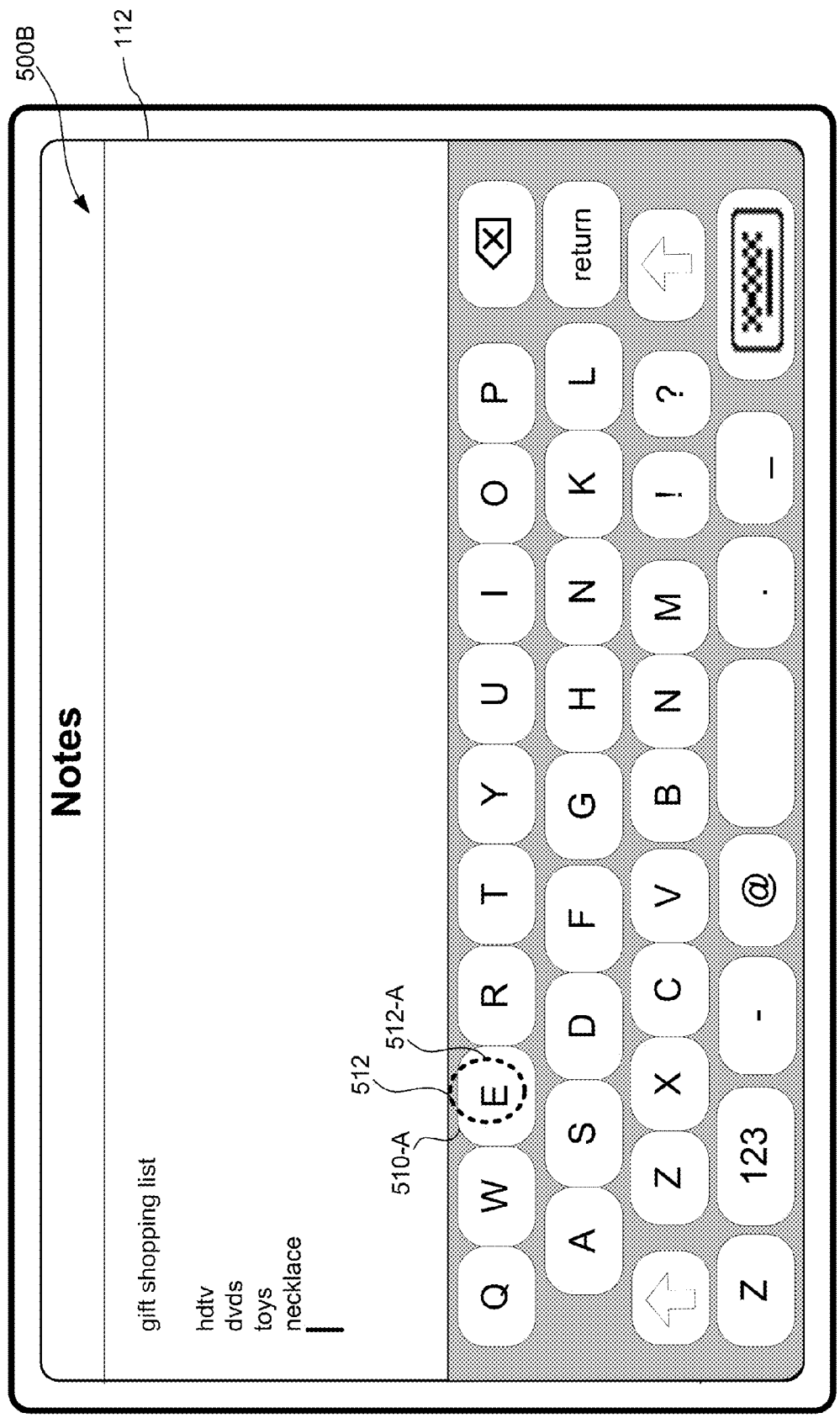
Figure 5C:
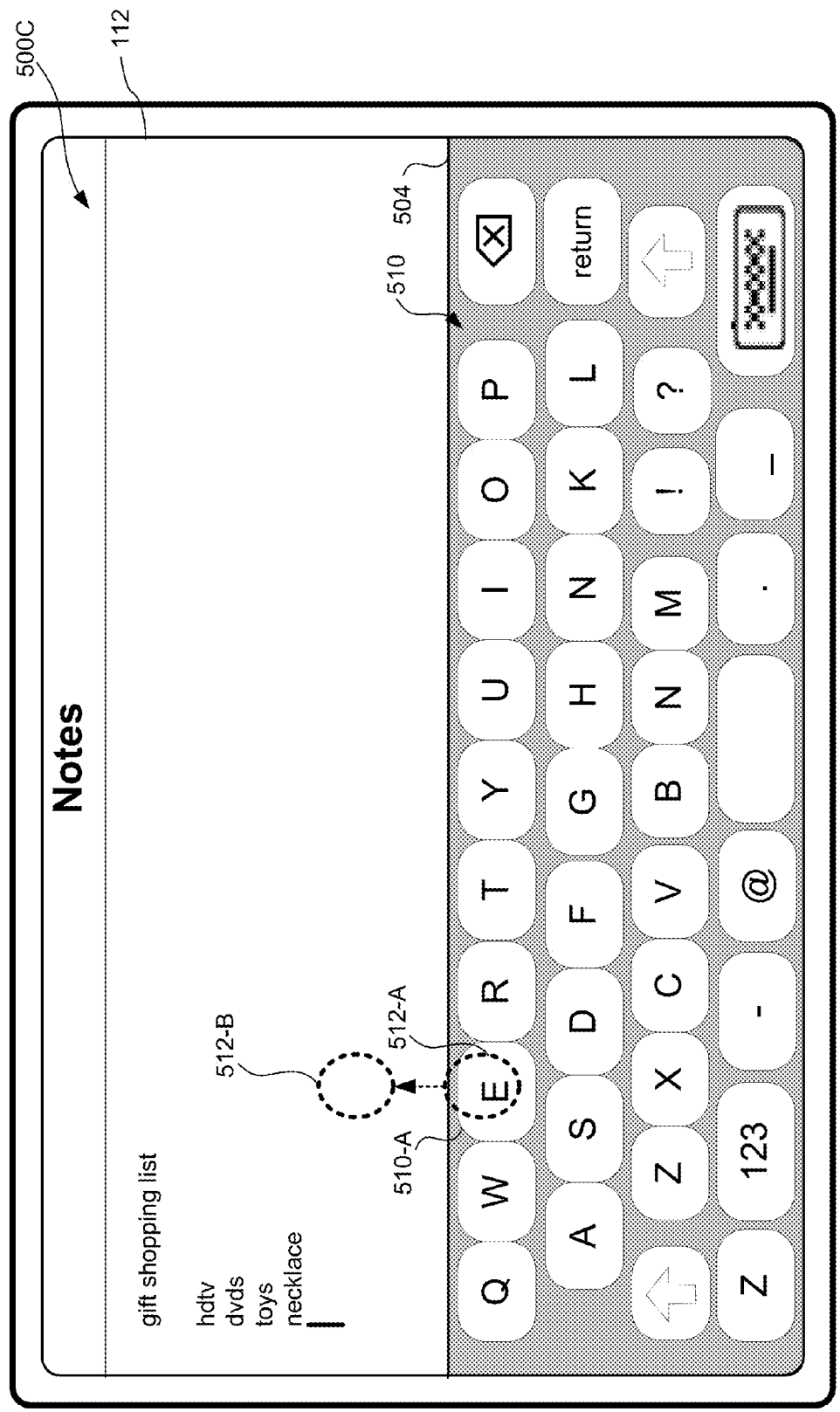
Figure 5D:
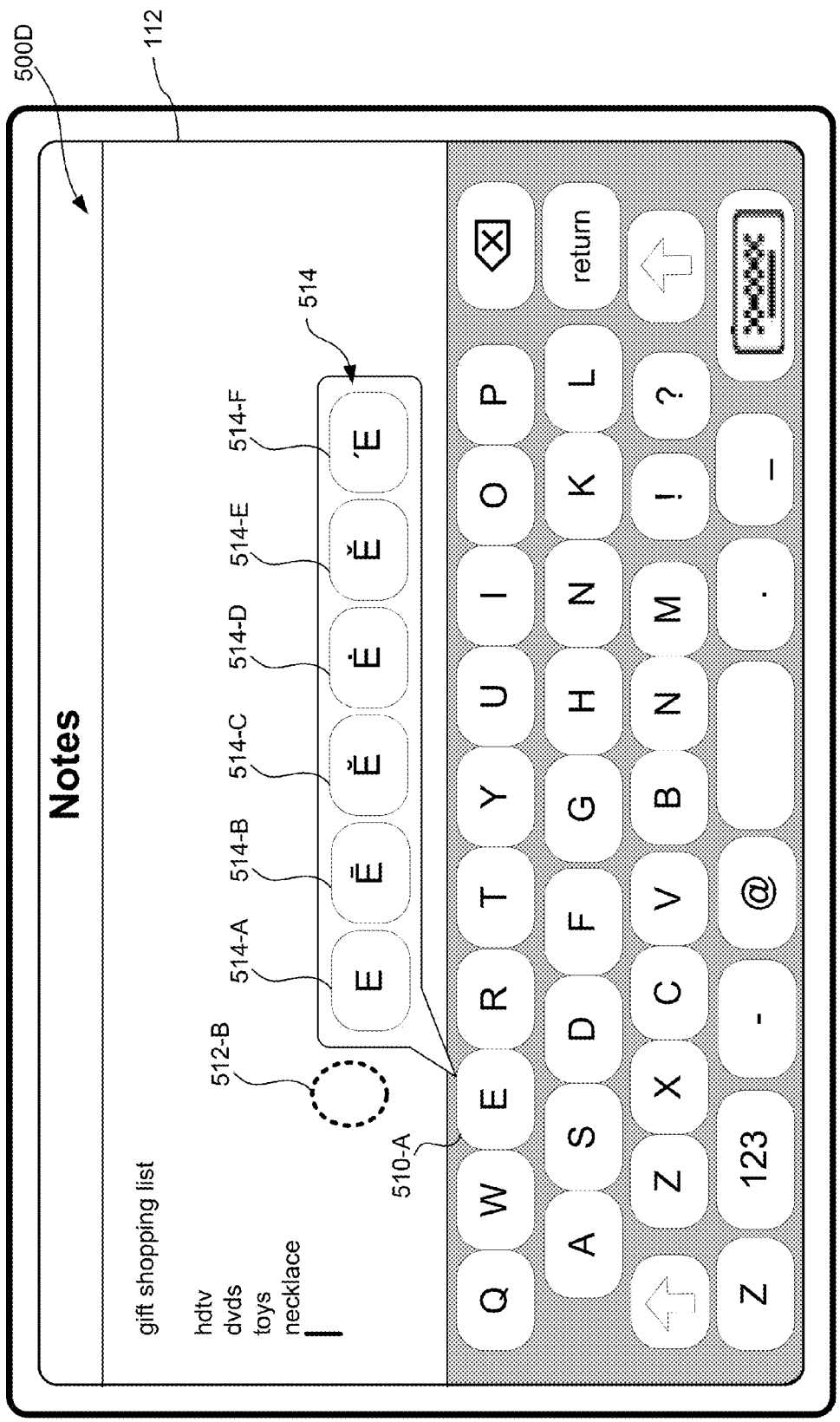
Figure 5E:
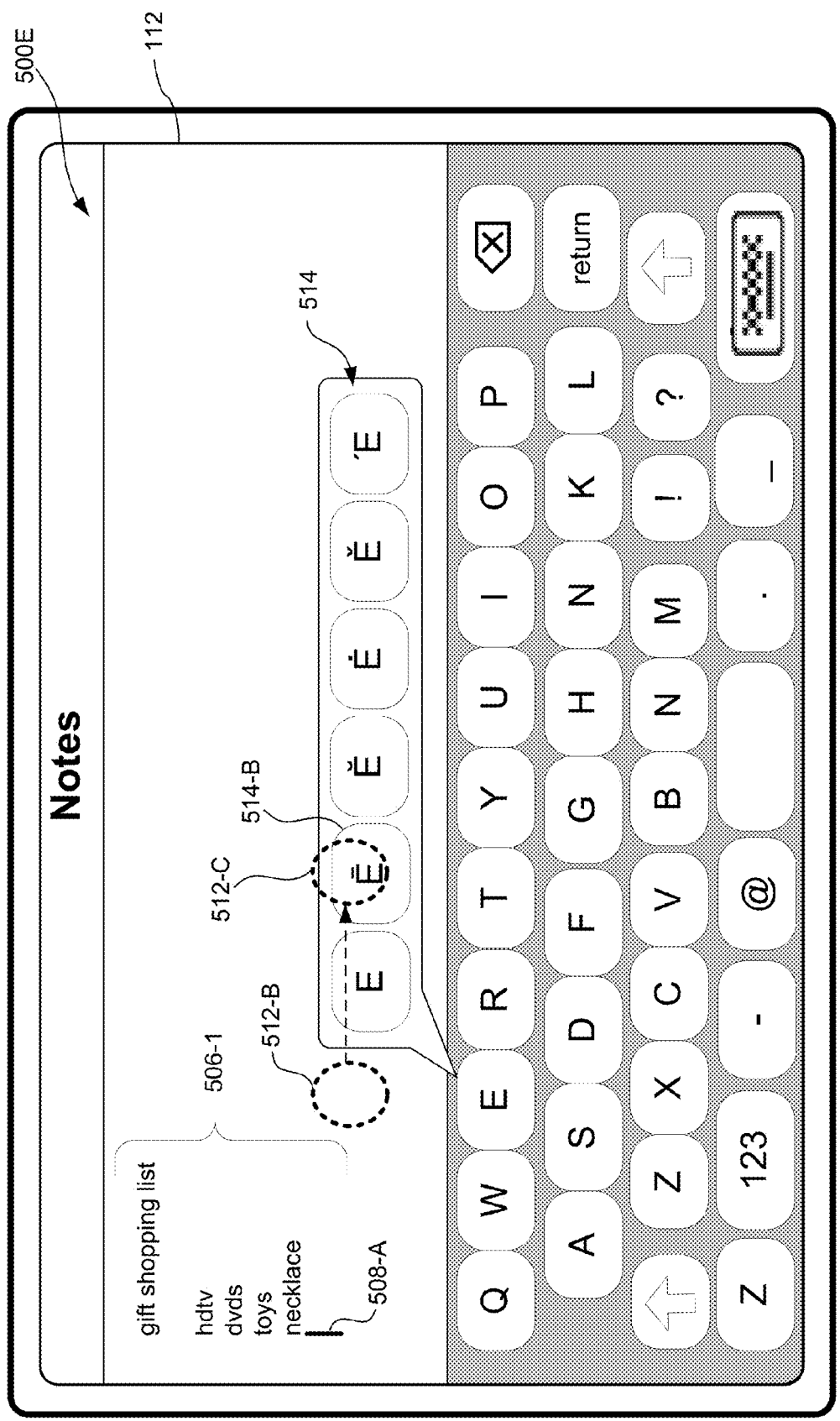

The device detects (604) a contact at a first location on the touch-sensitive display that corresponds to an activation region associated with a respective default key, wherein the respective default key has a plurality of alternate keys, and detects an immediate subsequent movement (e.g., upward movement) of the contact on the touch-sensitive display. For example, in FIG. 5B, contact 512 is detected at location 512-A, which corresponds to the activation region of key 510-A. In FIG. 5C, immediate upward movement of contact 512 from location 512-A to location 512-B is detected.

As used in this specification, "immediate" movement of a contact from one location to another is movement of the contact that is initiated within a short predefined period of time from the initial contact, wherein the predefined period of time has a duration of at least 0.2 seconds and no more than 1.5 seconds (e.g., within 0.3, 0.4, 0.5, 0.6, 0.75 or 1.0 seconds).

The device, in response to detecting the immediate subsequent movement of the contact, while continuing to display the plurality of default keys of the soft keyboard, displays (606) an array of keys including the plurality of alternate keys for the respective default key, where each key in the array has an associated activation region. For example, in FIG. 5D, an array of alternate keys 514 for default key 510-A is displayed in response to detection of the immediate subsequent upward movement of the contact 512 from location 512-A to location 512-B, while the default keys 510 continue to be displayed. Each alternate key 514 has a respective activation region; in some embodiments, the periphery of a respective key 514 indicates its respective activation region.

In some embodiments, the device displays (608) the plurality of alternate keys in an order that is determined based at least in part on a language associated with the soft keyboard. For example, in FIG. 5D, the keyboard 504 can be associated with a language, and the alternate keys 514-A thru 514-F can be displayed in an ordering or positioning that is at least based on which diacritics (or no diacritic) are most commonly added within that language to the letter "E" associated with default key 510-A; the keys associated with no diacritic and the more commonly added diacritics are displayed closer to the default key 510-A.

In some embodiments, the order or positions in which the alternate keys are displayed within the array is determined base at least in further part on respective usage frequencies of the alternate keys (610). For example, in FIG. 5D, if the user has accumulated a history at the device of entering the letter "E" with the macron (using key 514-B) more often than entering the letter "E" with the breve (using key 514-C), then key 514-B is displayed closer to default key 510-A than key 514-C.

The device detects a liftoff of the contact at a second location on the touch screen display (612). For example, in FIGS. 5E and 5G, the contact is moved from location 512-B to location 512-C and location 512-D, respectively. At locations 512-C or 512-D, a liftoff or breaking of the contact can occur (e.g., by the user moving their finger away from the touch screen 112).

Figure 5F:
Figure 5G:
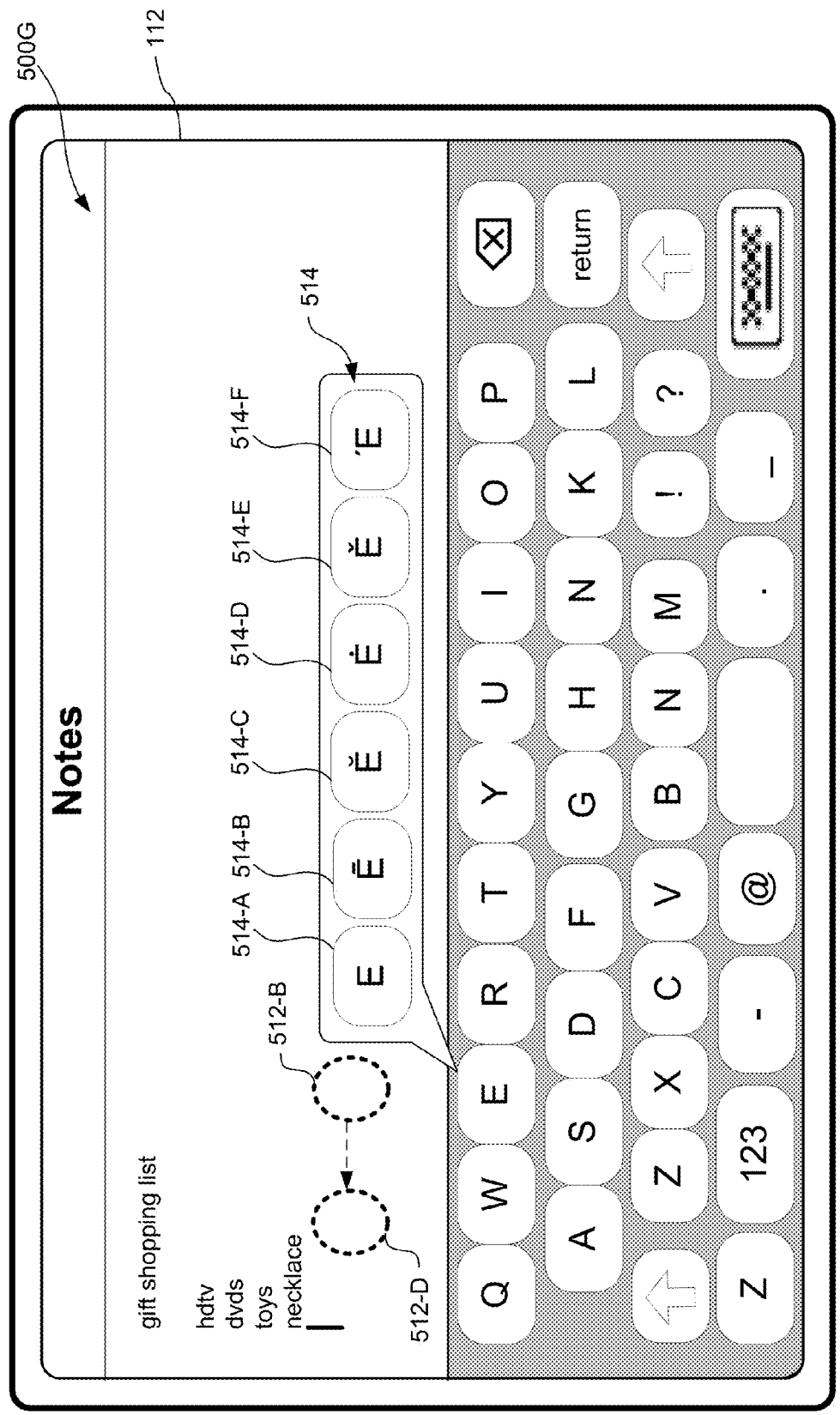

In response to detecting the liftoff of the contact (613), when the second location corresponds to an activation region that is associated with a respective alternate key in the array, the devices ceases displaying (614) the array and inserts a character associated with the respective alternate key into the text entry region. For example, in FIG. 5E, location 512-C is at a location that corresponds to the activation region of alternate key 514-B, which is associated with the letter "E" with a macron. In response to a liftoff of the contact at location 512-C, the array of alternate keys 514 ceases to be displayed and a character representing the letter "E" with a macron is inserted as character 516 into input text 506 in text entry region 502 (text 506-1 changes to text 506-2), as illustrated in FIG. 5F.

In response to detecting the liftoff of the contact (613), when the second location corresponds to a region of the touch-sensitive display that is not an activation region for any of the keys in the array, the device ceases displaying (616) the array without inserting any character into the text entry region. For example, in FIG. 5G, location 512-D is at a location that does not correspond to the activation region of any of the alternate keys 514. In response to a liftoff of the contact at location 512-D, the array of alternate keys 514 ceases to be displayed and no letter is inserted into the input text 506, as illustrated in FIG. 5A.

Figure 5H:
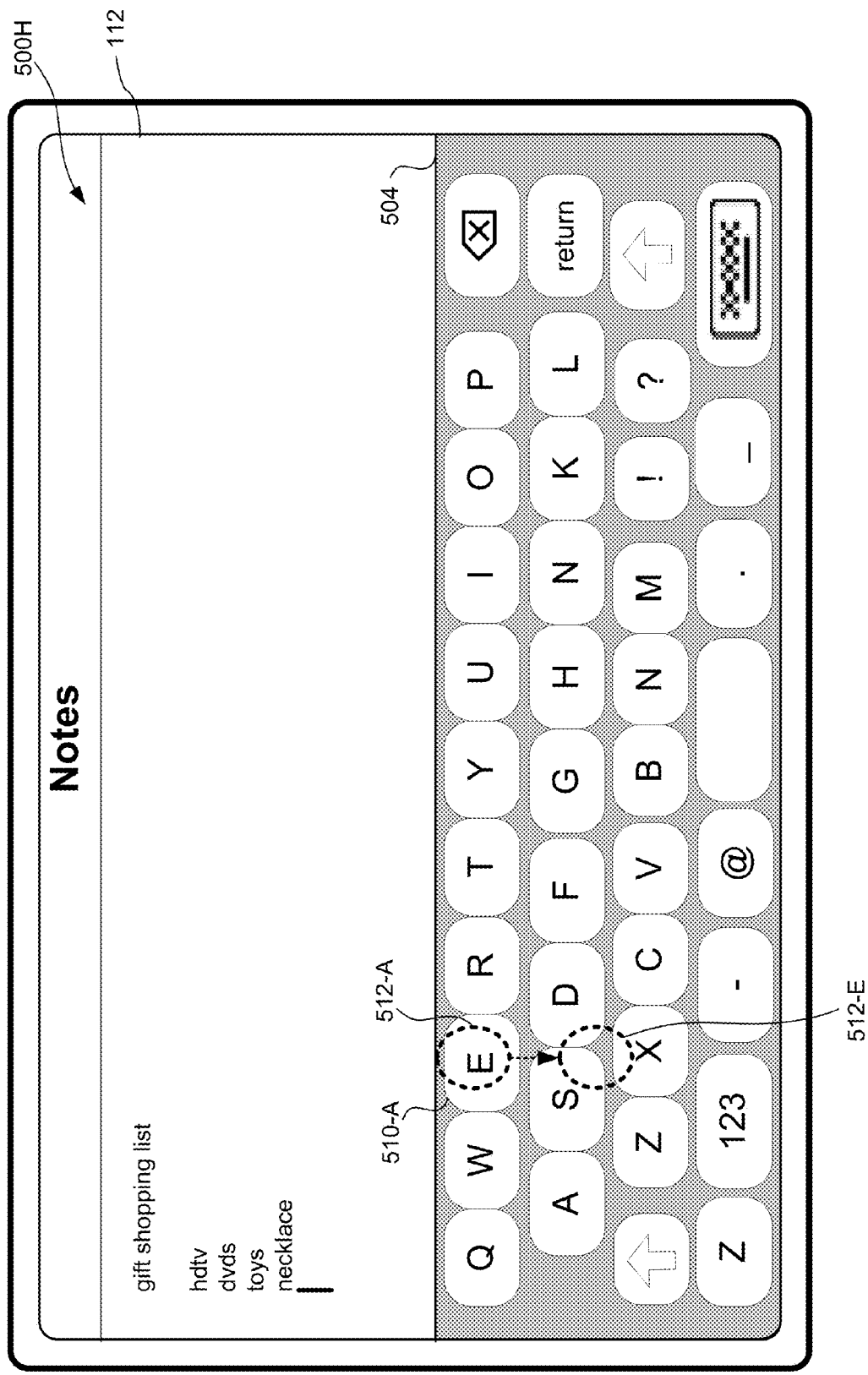
Figure 5I:
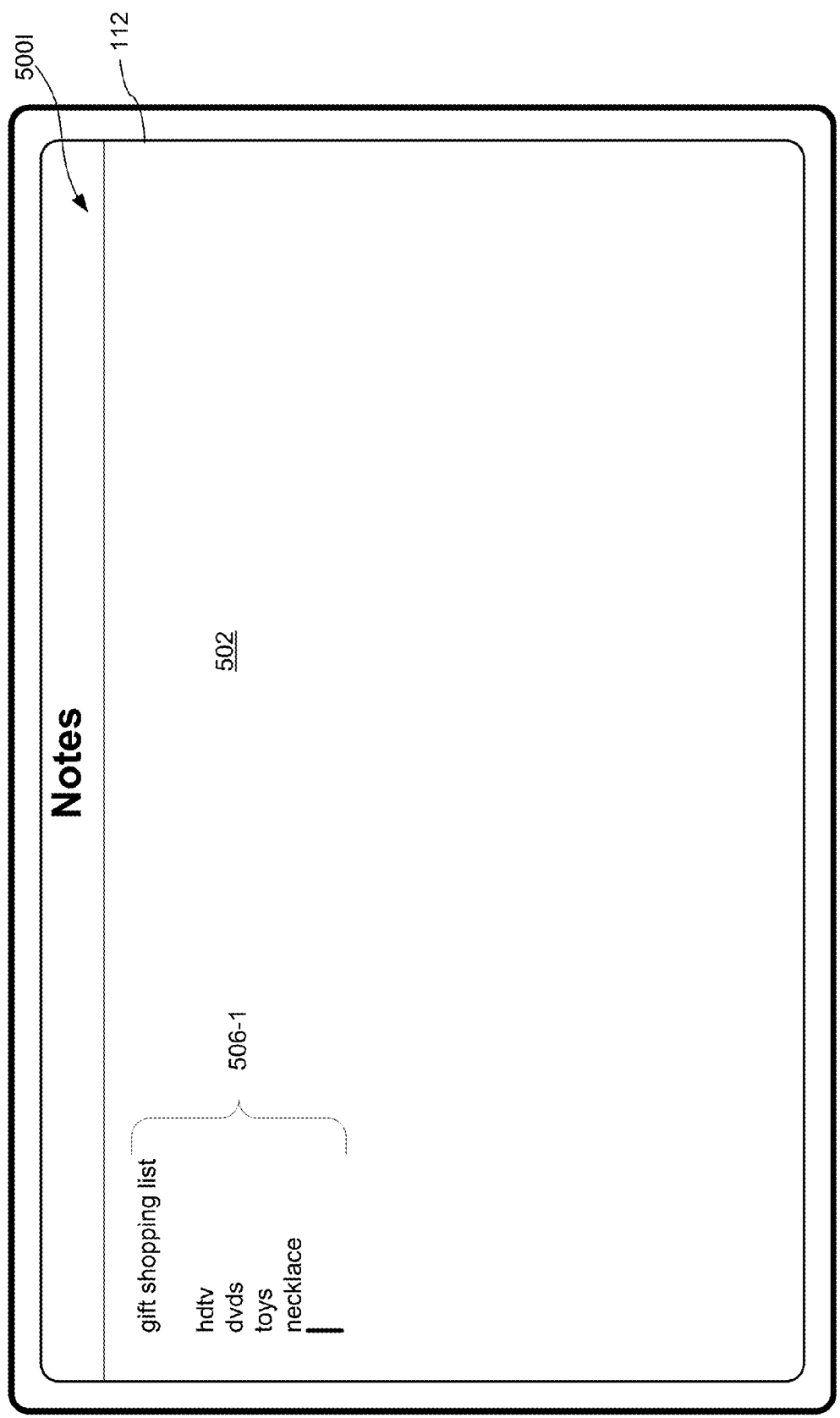

In some embodiments, the soft keyboard can be hidden using a movement of the contact opposite of the movement that results in the displaying of the array of alternate keys. For example, the device detects (618) a contact at a location on the touch-sensitive display that corresponds to an activation region associated with a respective default key, and detects an immediate subsequent downward movement of the contact on the touch-sensitive display. For example, in FIG. 5B, contact 512 is detected at a location 512-A corresponding to the activation region of key 510-A. In FIG. 5H, an immediate subsequent movement of the contact 512 downward from location 512-A to location 512-D is detected. In FIG. 5I, in response to detection of the immediate subsequent downward movement, the keyboard 504 is hidden (620) (i.e., ceases to be displayed).

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B and 3) are included within the scope of protection of the invention.

The operations described above with reference to FIGS. 6A-6C may be implemented by components depicted in FIGS. 1A-1C. For example, detection operation 604 and displaying operation 606 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 180 associated with the detection of the event or sub-event. Event handler 180 may utilize or call data updater 176 or object updater 177 to update the application internal state 192. In some embodiments, event handler 180 accesses a respective GUI updater 178 to update what is displayed by the application. Similarly, it would be clear to a person having ordinary skill in the art how other processes can be implemented based on the components depicted in FIGS. 1A-1C.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A multifunction device, comprising:
a touch-sensitive display;
one or more processors;
memory; and
one or more programs, wherein the one or more programs are stored in the memory and configured to be executed by the one or more processors, the one or more programs including instructions for:
displaying a text entry region and a soft keyboard having a plurality of default keys;
detecting an initial touchdown of a contact at a first location on the touch-sensitive display that corresponds to an activation region associated with a respective default key, wherein the respective default key has a plurality of alternate keys;
detecting an immediate subsequent movement of the contact from the first location on the touch-sensitive display that corresponds to an activation region associated with a respective default key on the touch-sensitive display, wherein detecting the immediate subsequent movement of the contact includes:
detecting movement of the contact from the first location;
determining a period of time between detecting the initial touchdown of the contact at the first location and detecting movement of the contact from the first location; and
determining whether the period of time between detecting the initial touchdown of the contact at the first location and detecting movement of the contact from the first location is within a predefined period of time;
in response to detecting the immediate subsequent movement of the contact, while continuing to display the plurality of default keys of the soft keyboard, displaying an array of keys including the plurality of alternate keys for the respective default key, each key in the array having an associated activation region;
detecting liftoff of the contact at a second location on the touch-sensitive display; and,
in response to detecting the liftoff of the contact:
when the second location corresponds to an activation region that is associated with a respective alternate key in the array, ceasing to display the array and inserting a character associated with the respective alternate key into the text entry region; and
when the second location corresponds to a region of the touch-sensitive display that is not an activation region for any of the keys in the array, ceasing to display the array without inserting any character into the text entry region.

2. The device of claim 1, including instructions for:
detecting a contact at a location on the touch-sensitive display that corresponds to an activation region associated with a respective default key, and detecting an immediate subsequent downward movement of the contact on the touch-sensitive display; and
in response to detecting the immediate subsequent downward movement of the contact, hiding the soft keyboard.

3. The device of claim 1, including instructions for displaying the plurality of alternate keys in an order that is determined based at least in part on a language associated with the soft keyboard.

4. The device of claim 3, wherein the order is determined based at least in further part on respective usage frequencies of the plurality of alternate keys.

5. The device of claim 1, wherein the array is a horizontal array.

6. The device of claim 1, wherein the detected immediate subsequent movement is an upward movement of the contact on the touch-sensitive display.

7. A method, comprising:
at a multifunction device with a touch-sensitive display:
displaying a text entry region and a soft keyboard having a plurality of default keys;
detecting an initial touchdown of a contact at a first location on the touch-sensitive display that corresponds to an activation region associated with a respective default key, wherein the respective default key has a plurality of alternate keys;
detecting an immediate subsequent movement of the contact from the first location on the touch-sensitive display that corresponds to an activation region associated with a respective default key on the touch-sensitive display, wherein detecting the immediate subsequent movement of the contact includes:
detecting movement of the contact from the first location;
determining a period of time between detecting the initial touchdown of the contact at the first location and detecting movement of the contact from the first location; and
determining whether the period of time between detecting the initial touchdown of the contact at the first location and detecting movement of the contact from the first location is within a predefined period of time;
in response to detecting the immediate subsequent movement of the contact, while continuing to display the plurality of default keys of the soft keyboard, displaying an array of keys including the plurality of alternate keys for the respective default key, each key in the array having an associated activation region;
detecting liftoff of the contact at a second location on the touch-sensitive display; and
in response to detecting the liftoff of the contact:
when the second location corresponds to an activation region that is associated with a respective alternate key in the array, ceasing to display the array and inserting a character associated with the respective alternate key into the text entry region; and when the second location corresponds to a region of the touch-sensitive display that is not an activation region for any of the keys in the array, ceasing to display the array without inserting any character into the text entry region.

8. The method of claim 7, further comprising:

detecting a contact at a location on the touch-sensitive display that corresponds to an activation region associated with a respective default key, and detecting an immediate subsequent downward movement of the contact on the touch-sensitive display; and in response to detecting the immediate subsequent downward movement of the contact, hiding the soft keyboard.

9. The method of claim 7, wherein displaying the array of keys including the plurality of alternate keys for the respective default key comprises:

displaying the plurality of alternate keys in an order that is determined based at least in part on a language associated with the soft keyboard.

10. The method of claim 9, wherein the order is determined based at least in further part on respective usage frequencies of the plurality of alternate keys.

11. The method of claim 7, wherein the array is a horizontal array.

12. The method of claim 7, wherein the detected immediate subsequent movement is an upward movement of the contact on the touch-sensitive display.

13. A non-transitory computer readable storage medium storing one or more programs, the one or more programs comprising instructions, which when executed by a multifunction device with a touch-sensitive display, cause the device to:

display a text entry region and a soft keyboard having a plurality of default keys;

detect an initial touchdown of a contact at a first location on the touch-sensitive display that corresponds to an activation region associated with a respective default key, wherein the respective default key has a plurality of alternate keys;

detect an immediate subsequent movement of the contact from the first location on the touch-sensitive display that corresponds to an activation region associated with a respective default key on the touch-sensitive display, wherein detecting the immediate subsequent movement of the contact includes:

detect movement of the contact from the first location;

determine a period of time between detecting the initial touchdown of the contact at the first location and detecting movement of the contact from the first location; and determine whether the period of time between detecting the initial touchdown of the contact at the first location and detecting movement of the contact from the first location is within a predefined period of time;

in response to detecting the immediate subsequent movement of the contact, while continuing to display the plurality of default keys of the soft keyboard, display an array of keys including the plurality of alternate keys for the respective default key, each key in the array having an associated activation region;

detect liftoff of the contact at a second location on the touch-sensitive display; and, in response to detecting the liftoff of the contact:

when the second location corresponds to an activation region that is associated with a respective alternate key in the array, cease displaying the array and insert a character associated with the respective alternate key into the text entry region; and when the second location corresponds to a region of the touch-sensitive display that is not an activation region for any of the keys in the array, cease displaying the array without inserting any character into the text entry region.

14. The non-transitory computer readable storage medium of claim 13, including instructions that cause the device to:

detect a contact at a location on the touch-sensitive display that corresponds to an activation region associated with a respective default key, and detect an immediate subsequent downward movement of the contact on the touch-sensitive display; and in response to detecting the immediate subsequent downward movement of the contact, hide the soft keyboard.

15. The non-transitory computer readable storage medium of claim 13, including instructions that cause the device to display the plurality of alternate keys in an order that is determined based at least in part on a language associated with the soft keyboard.

16. The non-transitory computer readable storage medium of claim 15, wherein the order is determined based at least in further part on respective usage frequencies of the plurality of alternate keys.

17. The non-transitory computer readable storage medium of claim 13, wherein the array is a horizontal array.

18. The non-transitory computer readable storage medium of claim 13, wherein the detected immediate subsequent movement is an upward movement of the contact on the touch-sensitive display.

* * * * *